US012090520B2

(12) United States Patent
Sutton

(10) Patent No.: US 12,090,520 B2
(45) Date of Patent: Sep. 17, 2024

(54) RECYCLING METHOD AND TAGGANT FOR A RECYCLABLE PRODUCT

(71) Applicant: Philip Sutton, Neston (GB)

(72) Inventor: Philip Sutton, Neston (GB)

( * ) Notice: Subject to any disclaimer, the term of this patent is extended or adjusted under 35 U.S.C. 154(b) by 0 days.

(21) Appl. No.: 16/982,558

(22) PCT Filed: Mar. 21, 2019

(86) PCT No.: PCT/GB2019/050793
§ 371 (c)(1),
(2) Date: Sep. 19, 2020

(87) PCT Pub. No.: WO2019/180438
PCT Pub. Date: Sep. 26, 2019

(65) Prior Publication Data
US 2021/0001377 A1    Jan. 7, 2021

(30) Foreign Application Priority Data

Mar. 21, 2018 (GB) .................................... 1804541
Jun. 13, 2018 (GB) .................................... 1809713
Oct. 12, 2018 (GB) .................................... 1816656

(51) Int. Cl.
*B07C 5/34*      (2006.01)
*B07C 5/342*     (2006.01)
*B09B 3/00*      (2022.01)
*B29B 17/00*     (2006.01)
*B29B 17/02*     (2006.01)
(Continued)

(52) U.S. Cl.
CPC ............ *B07C 5/3412* (2013.01); *B07C 5/342* (2013.01); *B29B 17/02* (2013.01); *G06N 3/08* (2013.01);
(Continued)

(58) Field of Classification Search
CPC .................. B07C 5/3412; B07C 5/342; B07C 2501/0054; B29B 17/02;
(Continued)

(56) References Cited

U.S. PATENT DOCUMENTS

2006/0070930 A1   4/2006  Wening
2006/0167580 A1   7/2006  Whittier
(Continued)

FOREIGN PATENT DOCUMENTS

GB    2330409 A    4/1999
JP    3487608 B2  10/1994
(Continued)

OTHER PUBLICATIONS

Hans-Jurgen, Bach, "Substance Containing Plastic, Glass, Textiles or Paper, Provided with a NIR Tag and a Method for Identifying Said Substance (English Translation)", Apr. 11, 2002, www.worldwide.espacenet.com (Year: 2002).*

(Continued)

*Primary Examiner* — Michael McCullough
*Assistant Examiner* — Molly K Devine
(74) *Attorney, Agent, or Firm* — Craft Chu PLLC; Andrew W. Chu

(57) ABSTRACT

The method of uniquely identifying a product for subsequent recycling includes marking a surface of the product with a first trace signature being representative of the manufacturer of the product.

8 Claims, 16 Drawing Sheets

(51) Int. Cl.
  *B29B 17/04* (2006.01)
  *G06K 7/14* (2006.01)
  *G06N 3/08* (2023.01)
  *G06Q 10/0833* (2023.01)
  *G06Q 30/018* (2023.01)
  *G06V 10/82* (2022.01)
  *G06V 20/60* (2022.01)

(52) U.S. Cl.
  CPC .... *G06Q 30/018* (2013.01); *B07C 2501/0054* (2013.01); *G06K 7/1413* (2013.01); *G06K 7/1417* (2013.01)

(58) Field of Classification Search
  CPC .... B29B 2017/0213; B29B 2017/0279; B29B 2017/0282; G06Q 30/018; G06K 7/1404; G06K 7/1413; G06K 7/1417; Y02W 30/62
  USPC .................................................. 209/3.3, 524
  See application file for complete search history.

(56) References Cited

U.S. PATENT DOCUMENTS

| 2010/0185506 | A1* | 7/2010 | Wolff | G06Q 30/02 707/E17.014 |
| 2017/0014868 | A1* | 1/2017 | Garcia, Jr. | B07C 5/346 |
| 2017/0174440 | A1* | 6/2017 | Ripley | G06V 10/40 |

FOREIGN PATENT DOCUMENTS

| WO | WO-0044508 A2 * | 8/2000 | ........ B07C 5/3412 |
| WO | 0228954 A1 | 4/2002 | |

OTHER PUBLICATIONS

The Huth-Fehre et al: "Molecular Structure NIR—Remote Sensing and Artificial Neural Networks for Rapid Identification of Post Consumer Plastics", Elsevier Journal of Journal of Molecular Structure, Jan. 1, 1995, pp. 143-146, XP055634894.

* cited by examiner

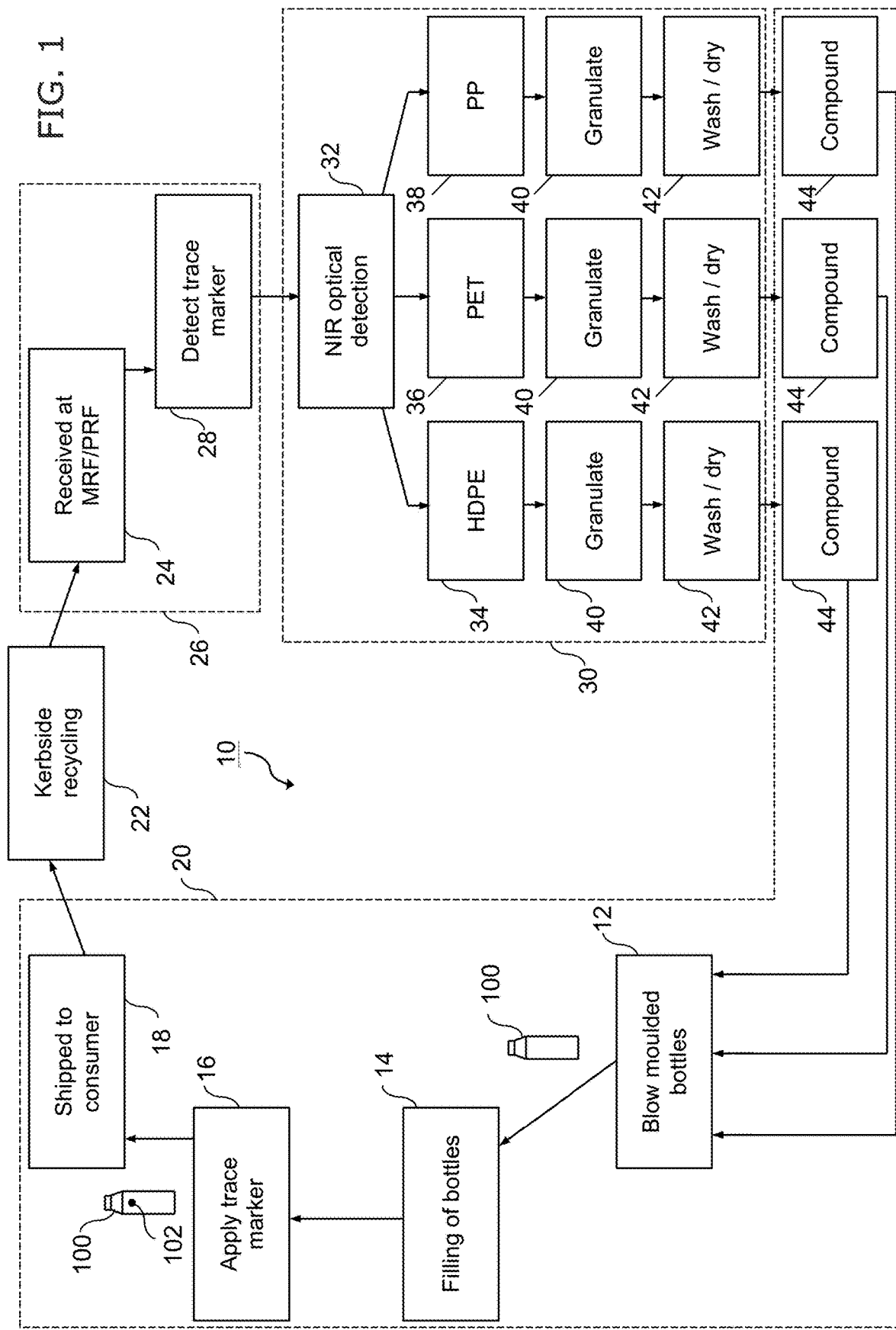

FIG. 6

RECYCLING METHOD AND TAGGANT FOR A RECYCLABLE PRODUCT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention relates to a recycling method and taggant for a recyclable product or material. In particular, this invention relates to a recycling method and taggant for a recyclable product that can be used to quickly and easily identify post-consumer material to its originating source of manufacture. This enables the manufacturer to recover a known material and rheology resource for true closed loop recycling.

2. Description of Related Art Including Information Disclosed Under 37 CFR 1.97 and 37 CFR 1.98

Many foodstuffs, and domestic/commercial cleaning products, personal care products etc. are packaged in single use polymer for ease of transport and use.

It has come very apparent over recent years that traditional methods of recycling need to evolve to embrace the circular economy method of "produce and reuse" rather than "produce and dispose". One area of immediate focus is single use post-consumer/industrial polymer synthetic packaging. Recent public and governmental pressures are now the driving impetus to find a more sustainable solution to this seemingly ever-growing problem.

Currently, plastic bottle recycling has been undertaken in a manner that is not defined by manufacturer's polymer grades and colours, thus limiting further recycling opportunities and alignment to the circular economy. In order to address this problem, a WRAP UK and Innovate UK funded feasibility study was carried out in 2014 on the technical and commercial viability of using identification technique based on fluorescent pigments applied as a masterbatch or pigment within labels to plastics packaging to enable the automatic separation of a wide range of target materials, such as High-Density Polyethylene (HDPE), Polyethylene Terephthalate (PET) and Polypropylene (PP) to enable closed loop recycling. Whilst the addition of a masterbatch could be used to separate different target materials, it was found to be too expensive to upscale, and having ultraviolet stability issues when used with products with long expiry dates. Perhaps more importantly, for food packaging plastics, there were food contact issues. Alternatively, marking by RFID chips on labels to track products has been proposed. This marking can become damaged or unreadable during the baling process, and reliable recycling data has hitherto been almost impossible to obtain given the harsh environment (because of the volume and throughput) in which recyclable products are processed at recycling facilities.

Other marking systems known in the art include chemical etching. Chemical etching could be utlised within tooling to etch a pattern or marker or code capable of being read by a machine or human on the surface of a moulded product, however, this pattern or marker or code will be fixed, thus limiting rapid changes to data and information required by the manufacturer, filler or brand owner and could not be easily changed or modified without decommissioning the production tooling, which is highly undesirable.

What the present invention is proposing is very different. It enables plastics home and personal care products to be separated at the Materials Recovery Facility (MRF) and/or Plastics Recovery Facility (PRF) based on their originating source of manufacture using a simple and inexpensive mark or dot. This enables the manufacturer to recover a known material and rheology resource for true closed loop recycling.

It will be appreciated that within this application, the term "manufacturer" can mean any manufacturer in the product lifecycle, including manufacturers of the product and manufacturers who use the product, such as, for example, those who use the product to sell their goods, such as, for example, a bottle filler. Accordingly, the term manufacturer includes manufacturers which undertake direct and indirect procurement within the supply chain and lifecycle of the product.

It is an object of the present invention to provide a recycling method and taggant for a recyclable product which overcomes or reduces the drawbacks associated with known products of this type. The present invention provides a recycling method and taggant for a recyclable material which is implemented as one or more UV, NIR and/or IR readable ink colours and shapes being allocated to each manufacturer, and furthering this with the allocation of additional colours and shapes being allocated to manufacturer's brands enabling the detection of materials through MRF and/or PRF for separation and onward recycling back to the primary or originating source of manufacture. It is a further object of the present invention to provide traceable packaging materials and products which are recoverable through the supply chain and which allows the materials to be returned to its originating source of manufacture for recycling, and thus making the process compliant with duty of care and corporate governance policies. It is a further object of the present invention to reduce the reliance on virgin polymers, whilst vastly increasing recycling rates and reducing costs. It is a further object of the present invention to provide a fully automated method for separating a recyclable material from a feedstock for subsequent recycling back to the originating source of manufacture through the use of artificial intelligence. The present invention has the ability to enhance manufacturer's Corporate Social Responsibility (CSR) policies and dramatically improve environmental resource efficiencies, and thereby address many of the problems with single use plastics. In addition, use of the present invention can ensure compliance with other legislative drivers and strategies, such as, Extended Producer Responsibly (EPR), Packaging Recovery Note (PRN) and Packaging Export Recovery Note (PERN).

BRIEF SUMMARY OF THE INVENTION

The present invention is described herein and in the claims.

According to the present invention there is provided a method of marking a product with a machine readable code, the method comprising the steps of:
creating a trained database of digital images of marked products;
applying a machine readable code to at least a portion of the product or its packaging;
reading and validating the code applied to the product;
exposing the product to an excitation condition such that the machine readable code fluoresces to allow recovery of the machine readable code; and
capturing a first image of the fluorescing shape or colour of the machine readable code and matching the captured first image with the trained database to allow at least the manufacturer or brand of the product to be identified.

An advantage of the present invention is that it can be used to be used to identify post-consumer material by the manufacturer or brand of the product from a mixed feedstock, and also retrieve and validate data to ensure regulatory compliance and/or track consumption and lifecycle of the product and/or identify patterns, trends and associations and monitor sales and marketing activities and promotions.

Further preferably, the method further comprises the steps of:
correlating the recovered data from the machine readable code with the identified manufacturer or brand of the product; and
securely storing the correlated data in a remote database or cloud-based portal with timestamp and/or tracking information and/or metadata of the product.

In use, the method may further comprise the step of:
separating the product from a mixed feedstock for onward recycling based on the detected fluorescing shape or colour of the machine readable code.

Preferably, the machine readable code is a 1D, 2D or 3D barcode, data matrix or QR code or any other suitable coding structure.

Further preferably, the machine readable code being excited using radiation having an excitation wavelength in the UV, IR, NIR or visible light spectrum.

In use, the recovery of the machine readable code and the fluorescing shape or colour may be detected at the same or different excitation wavelengths within the same or different optical detectors.

Preferably, the recovered data in the machine readable code includes production data and/or PRN and/or PERN and/or EPR compliance information.

Further preferably, the method further comprising the step of:
capturing a second image of the shape of the product and matching the captured image with the trained database which looks for remnants of product labelling and/or product shape and colour to allow at least the manufacturer or brand of the product to be identified.

In use, the second image is captured at a different excitation wavelength from the first image.

Preferably, the machine readable code is a 2D data matrix which fluoresces red or orange under UV excitation.

Moreover, according to the present invention there is provided a system for tracking a product marked with a machine readable code, comprising:
a product database being configured to associate the product with a unique machine readable code being applied at least a portion of the product or its packaging, the database containing timestamp and/or tracking information and/or metadata of the product;
detection means for simultaneously exposing the product to an excitation condition such that the machine readable code fluoresces to allow the machine readable code to be read using a barcode reader, and a first camera means for capturing a first digital image of the fluorescing shape or colour of the machine readable code and matching the captured first image with one of a plurality of digital images of marked products to allow at least the manufacturer or brand of the product to be identified; and
means for automatically updating the product database with timestamp and/or tracking information and/or metadata of the product at one or more stages of the lifecycle of the product.

Preferably, the detection means further comprises:
second camera means for capturing a second digital image of the shape of the product and matching the captured image with the trained database which matches remnants of product labelling and/or product shape and colour to allow at least the manufacturer or brand of the product to be identified.

Likewise according to the present invention there is provided a method of uniquely identifying a product for subsequent recycling, comprising the step of:
marking an exposed outer surface of the product and/or a portion of the product beneath any sleeve or labelling attached thereto with a first trace signature being representative of the manufacturer of the product.

An advantage of the present invention is that it can be used to identify post-consumer material by primary manufacturer of the product, and thereby allowing the manufacturer to recover a known material and rheology resource for upcycling as new products.

Preferably, the first trace signature being any chemical or physical marker capable of being read at a detector.

Further preferably, the first trace signature is at least one ultraviolet (UV) and/or infrared (IR) readable dot being applied to the product using continuous inkjet printing or any other suitable marking or coding system.

In use, the at least one readable dot may be a fluorescent mark that is transparent, and is only detectable when it is illuminated with UV, NIR and/or IR light at the detector.

Preferably, the at least one readable dot is printed in pairs on generally opposing surfaces of the product.

Further preferably, the at least one readable dot is printed in a randomised manner around the surfaces of the product.

In use, the fluorescent mark may be applied as a luminescent or fluorescent ink.

Preferably, the luminescent mark is applied having a base layer being in contact with the product; a fluorescent layer on top of the base layer; and an uppermost protective layer on top of the fluorescent layer.

Further preferably, the base layer, the fluorescent layer and the uppermost protective layer are applied via a continuous inline inkjet printing or any other suitable marking or coding system.

In use, the base layer may be opaque and eliminates false detections when used with substantially transparent products.

Preferably, the fluorescent mark is completely removed during the subsequent recycling process.

Further preferably, the fluorescent mark does not obscure the branding and/or product information on the product.

In use, the first trace signature may be a dot being printed in one of a number of shapes and colours that are detectable by the detector.

Preferably, the dot is printed having a triangular, square, rectangular, pentagonal, hexagonal, octagonal, cylindrical or any suitable polygonal shape or vertical or horizontal line or band.

Further preferably, the first trace signature is detectable by its outer shape and/or visible colour and/or an alphanumeric identifier.

In use, the first trace signature may be applied to the product and/or a lid or closure to the product and/or a removable tear strip positioned between the product and the lid or closure.

Preferably, the first trace signature is applied to a printed label which is subsequently adhered to the product.

Further preferably, the label also comprises the manufacturer's name and/or a RAL or Pantone code being representative of the manufacturer of the product.

In use, the first trace signature may be applied as a masterbatch or polymer carrier to component parts of the product by pellet, liquid or powder form and supplied by gravimetric or other compatible dosing process.

Further preferably, the product is packaging.

In use, the packaging may be formed from a material selected from the group consisting, but not limited to, any one of the following: polymers, cardboard, paper, cellophane, ferrous and non-ferrous metals, composite alloys and the like.

Preferably, the method further comprises the step of:
marking a surface of the product with a second trace signature being representative of the brand or composition of the product.

Further preferably, the first and second trace signatures are detected separately.

In use, the method further comprises the step of:
marking a surface of the product with a plurality of trace signatures being representative of the source of manufacture and/or base polymer manufacturer and/or polymer material and/or material grade and/or brand of product, and which enables the subsequent separation of the product based on the detected attributes of the product.

Further preferably, the plurality of trace signatures are printed as a string of readable dots or as a 1D, 2D or 3D data matrix, barcode or QR code, or any other suitable industrial alpha, numerical or alphanumeric coding process.

Preferably, the string of readable dots are printed with a registration mark.

In use, the detector may detect the presence of illuminated UV and/or IR light and/or near-infrared and/or visible light and/or shape or pattern recognition.

Also according to the present invention there is provided a recyclable product, the product comprising a mark on the outer surface thereof being a first trace signature representative of the manufacturer of the product.

Further according to the present invention there is provided a method of detecting a uniquely marked product for subsequent recycling, comprising the step of:
reading an outer surface of the product with a detector; and
detecting a first trace signature being representative of the manufacturer of the product.

Furthermore, according to the present invention there is provided a method of closed loop recycling of a target product being marked with a first trace signature being representative of the manufacturer of the product, comprising the steps of:
detecting the first trace signature on the outer surface of the product and separating the detected target product from a mixed feedstock based on said detection;
optionally separating the target product further into subgroups based on the brand or composition thereof;
shredding the separated product into flakes;
washing the flakes
compounding the washed flakes; and
forming a new product from the compounded pellets.

Also further according to the present invention there is provided a label for securement to a recyclable product, the label being printed thereon with a first trace signature on the outer surface thereof, the first trace signature being representative of the manufacturer of the product.

Also moreover according to the present invention there is provided a method of uniquely identifying a target recyclable product in a continuous feedstock of mixed recyclable products, comprising the steps of:
capturing a digital image of the recyclable product;
creating a trained database of digital images of recyclable products;
recognising a recyclable product present in a digital image; and
matching the information from a product database with the recognised image of a target recyclable product.

Preferably, the method further comprises the step of:
separating the target recyclable product from the feedstock for subsequent recycling.

Further preferably, the step of separating the target recyclable product from the feedstock for subsequent recycling is achieved at a conveyor detecting speed of under around one metre per second and up to three metres per second and above.

In use, the target recyclable product may be separated from the feedstock based on the manufacturer or brand of the product.

Further preferably, the training and recognising steps are achieved using a neural network.

Also furthermore according to the present invention there is provided a computer program product for uniquely identifying a target recyclable product in a continuous feedstock of mixed recyclable products, comprising:
computer program means for capturing a digital image of the recyclable product;
computer program means for creating a trained database of digital images of recyclable products;
computer program means for recognising a recyclable product present in a digital image; and
computer program means for matching the information from a product database with the recognised image of a target recyclable product.

Furthermore also according to the present invention there is provided a system for uniquely identifying a target recyclable product in a continuous feedstock of mixed recyclable products, comprising:

means for capturing a digital image of the recyclable product;

means for creating a trained database of digital images of recyclable products;

means for recognising a recyclable product present in a digital image; and means for matching the information from a product database with the recognised image of a target recyclable product.

Preferably, the system further comprising:

means for separating the target recyclable product from the feedstock for subsequent recycling.

It is believed that a recycling method and taggant for a recyclable product in accordance with the present invention at least addresses the problems outlined above.

It will be obvious to those skilled in the art that variations of the present invention are possible and it is intended that the present invention may be used other than as specifically described herein.

BRIEF DESCRIPTION OF THE SEVERAL VIEWS OF THE DRAWINGS

The present invention will now be described by way of example only, and with reference to the accompanying drawings.

FIG. 1 is a flowchart showing the various steps of a method for recycling a recyclable material or product to its originating source of manufacture in accordance with the present invention.

FIG. 6 are schematic views, showing examples of how the plurality of taggants shown in FIG. 5 can be presented on the recyclable product.

DETAILED DESCRIPTION OF THE INVENTION

Figure 2A:
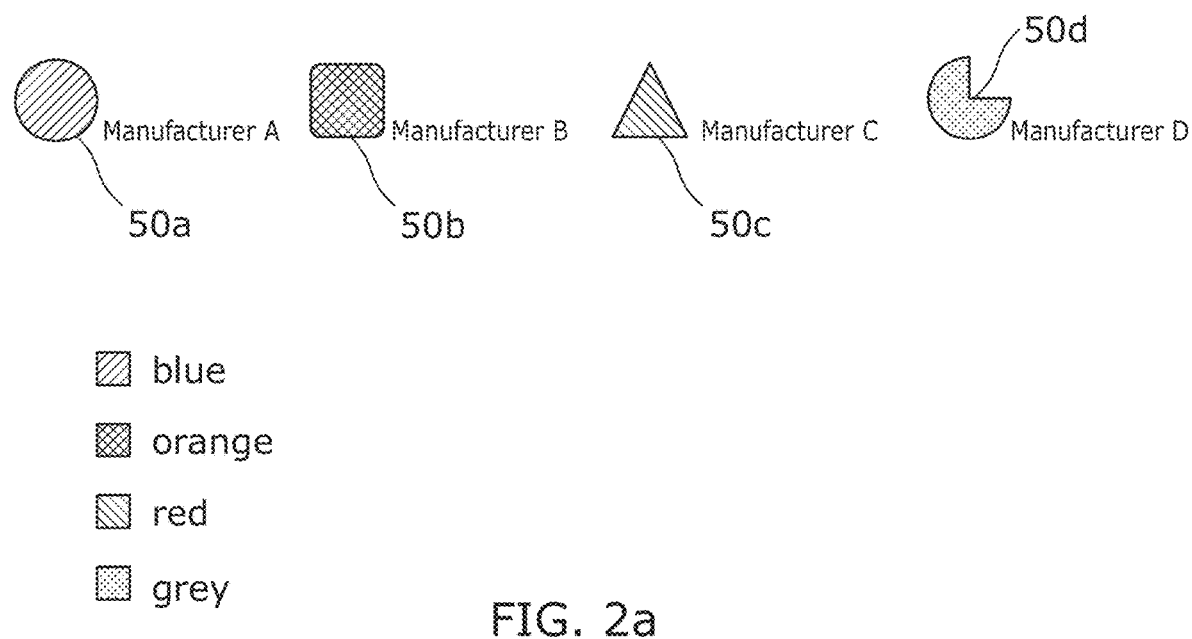
FIGS. 2a and 2b are schematic views, showing how the taggant of the present invention can be presented on the recyclable product itself, or on a separate label for subsequent securement to the product, respectively.

The present invention has adopted the approach of utilising a recycling method and taggant for a recyclable material which is implemented as one or more UV, NIR and/or IR readable ink colours and shapes being allocated to each manufacturer, and furthering this with the allocation of additional colours and shapes being allocated to manufacturer's brands enabling the detection of materials through MRF and/or PRF for separation and onward recycling back to the primary or originating source of manufacture. Advantageously, the present invention provides traceable packaging materials and products which are recoverable through the supply chain and which allows the materials to be returned to its originating source of manufacture for recycling, and thus making the process compliant with duty of care and corporate governance policies. Further advantageously, the present invention reduces the reliance on virgin polymers, whilst vastly increasing recycling rates and reducing costs. Further advantageously, the present invention also provides a fully automated method for separating a recyclable material from a feedstock for subsequent recycling back to the originating source of manufacture through the use of artificial intelligence. Further advantageously, the present invention has the ability to enhance manufacturer's CSR policies and dramatically improve environmental resource efficiencies, and thereby address many of the problems with single use plastics. In addition, use of the present invention can ensure compliance with other legislative drivers and strategies, such as, Extended Producer Responsibility (EPR), Packaging Recovery Note (PRN) and Packaging Export Recovery Note (PERN).

Referring now to the drawings, a method 10 according to the present invention for recycling a recyclable material or product to its originating source of manufacture is illustrated in FIG. 1. The method 10 described herein is a closed loop recycling method and therefore the skilled person will understand that the following description of it can be outlined starting at any point in the cycle. In the following description each step of FIG. 1 will be referred to as "S" followed by a step number, e.g. S12, S14 etc.

For illustrative purposes, the method 10 commences with the manufacturer 20 producing the recyclable material, packaging or product 100 at S12. The term "recyclable material, packaging or product" shall be understood to cover any item, substance or object that can be recycled. In the illustrative method 10 described in relation to FIG. 1, the product 100 is a blow moulded polymer bottle for containing a consumable, although this is in no way intended to be limiting.

At S14, the bottles are filled. At S16, a trace marker or taggant 102 is applied to the bottles which is representative of the originating source of manufacture and then the marker 102 can be read with the data being sent to the cloud in readiness for pairing within MRF/PRF 26, as will be described in further detail below. The bottles are then despatched from the manufacturer 20 to the end consumer, either directly, or through a retail network, at S18.

The skilled person will appreciate that S12, S14, S16 and S18 can all occur at, or be coordinated from, the manufacturer's facility 20.

After use, at S22, the consumer then returns the bottle through local kerbside recycling, and the collected bottle, at S24, is received at a Materials Recovery Facility (MRF) or Plastics Recovery Facility (PRF) 26 for sorting.

At S28, the method 10 involves detecting for the trace marker or taggant 102 on the product 100 using a detector, as will be described further below. This is a continuous conveyer process whereby positively-identified bottles, i.e., those identified by the presence of a trace marker or taggant 102, are ejected from the conveyer using pulses of air from a plurality of jets positioned adjacent to the conveyer.

The skilled person will understand that after the detection step S28, the bottles from one manufacturer 20 can be conveyed, or be baled for onward treatment/recycling, and this can occur either at the MRF/PRF 26 or at a secondary processing facility 30.

At the MRF/PRF 26 or secondary processing facility 30, S32 involves using standard near-infrared (NIR) detection techniques to further sort those already separated bottles of one manufacturer 20 into their polymer compositions. As shown for illustrative purposes in FIG. 1, at S32, the previously sorted bottles of one manufacturer 20 are then optically sorted into one of, for example, three polymer types: High-Density Polyethylene (HDPE) 34, Polyethylene Terephthalate (PET) 36 or Polypropylene (PP) 38.

Further separation is also possible, as will be described in FIG. 3.

With the closed loop recycling method 10 shown in FIG. 1, the separate streams of polymer types 34, 36, 38 can then be granulated/shredded at S40, prior to washing/drying at S42, and which produces free flowing flakes that are suitable for onward compounding or extrusion into pellets. The pellets are then compounded, and which may necessitate the addition of small amounts of virgin polymer at S44, prior to being reutilised as new products 100 at S12.

The skilled person will appreciate that once the trace marker or taggant 102 has been applied, the product 100 has a permanent and unique signature that is bespoke to the product's 100 source of manufacture 20.

The method 10 of the present invention allows the bottles to be detected at recycling facilities (MRF/PRF 26) by new or retrofitted computer file and light array upgrades to their current near-infrared (NIR) technologies that can automatically redirect the bottle to bunker or separate baler for onward reprocessing at the primary company's manufacturing facility 20 and thus creating a "bottle-to-bottle" opportunity. The primary manufacturer 20 then can be reassured that the polymer pellets it receives at S42 are of a base polymer rheology that is known to them before onward reprocessing.

The separation of the comingled bottles into single polymer types at S32 can be achieved using known near-infrared sorting technology is programmed to ignore the trace marker or taggant 102 and only recognise the base polymer compound signature, be it PP, HDPE, PET, Polyvinyl chloride (PVC), Acrylonitrile butadiene styrene (ABS) etc. to be separated accordingly. The base polymer compound signature can alternatively be detected using a second trace marker or taggant 102, as described in relation to FIGS. 3 to 6.

FIG. 2a shows how the trace marker or taggant 102 of the present invention can be applied to the product as a UV, NIR and/or IR readable dot 50a-50n which, in a preferred embodiment, is applied using continuous inkjet printing techniques at S16 of FIG. 1. The term "inkjet printing" shall be understood to cover any printing or marking technology that propels droplets of ink onto paper, plastic, or other substrates, such as, for example, Valvejet, Thermal inkjet, Drop-On-Demand and Piezoelectric inkjet. Other continuous printing or etching techniques, such as, for example, laser photonic printing or digital watermarking could alternatively be utilised to apply the trace marker or taggant 102 and/or printed codes 88 to the product 100.

Known recycling infrastructures are based on near-infrared (NIR) detection of different plastics. Therefore, IR readable dots 50a-50n could be easily integrated into existing recycling infrastructures. Currently the majority of waste infrastructure (MRF/PRF 26) utilise NIR detection equipment for materials separation, and NIR/IR inks would be accommodated easily within the current detection infrastructure system, possibly requiring only minor software and/or hardware upgrades.

With IR ink formulations, current near-infrared (NIR) detection technologies in MRF/PRF 26 operate at between 1300 nm to 1800 nm this is the standard operating detection window. Bespoke IR ink formulations can be provided as follows by way of example:

Brand A will fluoresce yellow at 1300 nm
Brand B will fluoresce red at 1400 nm
Brand C will fluoresce green at 1500 nm etc.

In addition, NIR/IR inks are less susceptible to degradation than UV inks, especially in environments in which the dots 50a-50n may be exposed to the external environment. Also, certain brands of fabric softener and detergent contain UV optical brighteners within the liquid product and packaging labels. This has the potential to cause onerous readings when using UV spectrum detection. In these cases, NIR/IR dots and spectrum detection can be used. IR dots will not be inhibited from signal when covered with surplus detergent, as many home care products, washing liquids and fabric softeners etc. contain UV brighteners within their formulation that could otherwise mask a UV ink mark signal. It is envisaged that UV, NIR and IR inks could be used as a combination taggant for a recyclable product 100, as described below in relation to FIG. 3.

The dot 50a-50n in a preferred embodiment of the invention is a luminescent or fluorescent mark that is transparent to the naked eye and is only detectable when it is energised by ultraviolet (UV), near-infrared (NIR) and/or infrared (IR) light at the detector, at S28. The skilled person will appreciate that the detection at S28 could alternatively be incorporated as part of the existing near-infrared detection step (S32) of the secondary processing facility 30.

In addition, the dot 50a-50n which uniquely identifies the manufacturer 20 of the product 100 can be any chemical or physical marker capable of being read by a machine or human. In a preferred embodiment, as S16, dots 50a-50n are applied in pairs on opposing surfaces of the product 100 and are printed using opposing inkjet printing heads (not shown), such that when the collected product 100 is processed at the MRF/PRF 26 it can be detected and blown or robotically picked out whatever orientation the product 100 takes on the conveyer.

In addition to the dot 50a-50n being detectable as a UV, NIR and/or IR marker, the skilled person will appreciate that the outer shape, visible colour and/or an alphanumeric identifier could also be provided as a means of a uniquely-marking the product 100. In the example shown in FIG. 2a, dot 50a is a blue circle which is associated with primary manufacturer A. Dot 50b is an orange square which is associated with primary manufacturer B. Dot 50c is a red triangle which is associated with primary manufacturer C, and dot 50n is a grey circular sector which is associated with primary manufacturer N, and so on. In an alternative embodiment, the dot 50a-50n can be provided in the form of a Quick Response (QR) or a 2D data matrix code 90, as described in further detail below and in relation to FIG. 8.

The skilled person will appreciate that should the product 100 not be detected by the UV, NIR and/or IR detector as S28, for example, it falls from the conveyor prior to detection at S28, an operative at the MRF/PRF 26 is able to separate the product 100 manually by simply interpreting the shape and/or colour of the dot 50a-50n. Clearly, the examples shown in FIG. 2a are only a subset of a much larger group of shapes and colours that could be utilised, and is for illustrative purposes only.

Figure 2B:
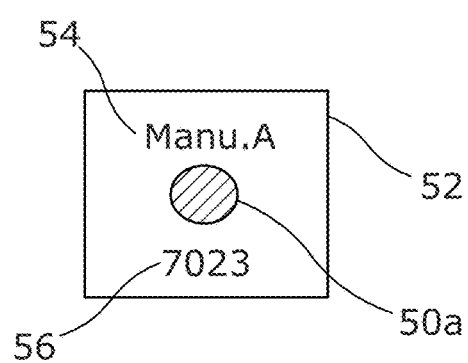

FIG. 2b shows that the dot 50a can also be applied to a printed label 52 which is then adhered to the product 100 when in use. The printed label 52 can also include the manufacturer's name 54 and a RAL or Pantone code 56, which can be a four- or six-digit code, and which allows an operative to manually identify the product 100 without having to pass the product 100 through the detector. The skilled person will appreciate that the preferred recycling method 10 of the present invention is an entirely automated process, however as a "fail-safe", various additional optical and/or alphanumeric and/or RAL/Pantone codes 56 can also be included so that an operative in the MRF/PRF 26 or at the secondary processing facility 30 can identify the product 100 manually.

The dot 50a-50n can also be printed on the on cap or closure of the product 100, and on the tear strip of the cap or closure, to ensure that every part of the product 100 can be detected and recycled.

A masterbatch could additionally be used in isolation within certain component parts (e.g., cap, closure, tear strip, label etc.) of the product 100 in unison with taggant markers, or on the outer surface of the product, and being dependent on product 100 or manufacturer's 20 requirements, as described below.

If the trace technology is to be applied to only the outer surface of the bottle, the chemical characteristics of the polyolefin grade of polymer require the surface of the substrate to be made "wetable", and one such suitable technology available in the art for this purpose would be corona discharge. When configured as dot 50a-50n, the ink technology used therein is completely removed during the recycling process, and/or is vented off as a gas or residue at a temperature consistent with polymer compounding (S44).

Such a tracer 102 can be recognised by current recycling infrastructure optical and near-infrared detection technologies. These detections systems are commonplace in MRF/PRF 26, and in secondary processing facilities 30, and can detect a multitude of material types, including polymers.

Figure 3:
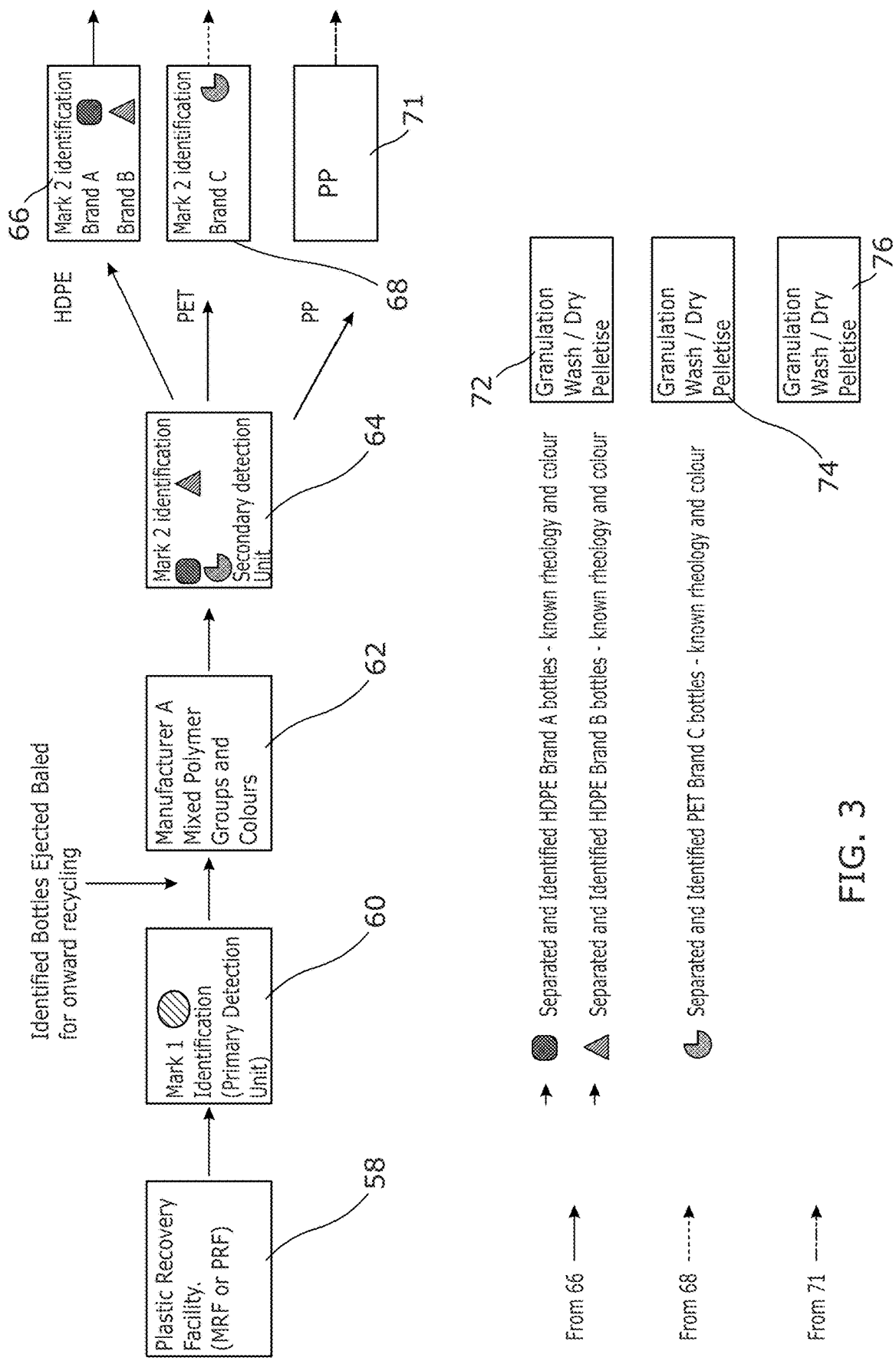
FIG. 3 illustrates a flowchart showing the various steps of a method according to a second embodiment of the present invention for recycling a recyclable material or product to its originating source of manufacture, and wherein the product has been additionally marked with a second taggant which is representative of the product's brand or polymer composition.

FIG. 3 shows a second embodiment of the closed loop recycling method 10. The method 10 of the second embodiment is very similar to that of the first embodiment and corresponding features have been given the same reference numerals. The second embodiment differs from the first embodiment in that instead of simply separating the products 100 at the MRF/PRF 26 based on the detection of the first dot 50a-50n signifying the source of manufacture 20, the products 100 are additionally marked with a secondary UV, NIR and/or IR readable dot 70a-70n being representative of the brand of the product 100. The advantage of this is that the MRF/PRF 26 will have the capability of detecting the first dot 50a-50n by manufacturer 20. The products 100 from one manufacturer 20 can then be baled for onward separation at the manufacturer's facility 20, or at a secondary processing facility 30, based instead on the particular brand of the product 100 or the polymer base material from which it is formed.

FIG. 3 shows further detail of such a two-stage detection method. It describes only part of the closed loop recycling method 10 that is described in FIG. 1, and replaces S24-S44 shown in FIG. 1.

In FIG. 3, at S58, the bottles, along with the other local kerbside recyclables, are received at the MRF/PRF 26 for sorting. A primary detection unit can be retrofitted into a MRF/PRF 26, and, at S60, the primary detection unit detects the first dot 50a-50n by manufacturer 20, but crucially not the secondary dots 70a-70n. The principal activity of the primary unit is to eject marked bottles irrelevant of polymer type, but only by the manufacturer dot 50a-50n. At the output of S60, a single source manufacturer's bottles, be it HDPE, PP, PET bottles are separated, and can be baled for onward recycling.

After detection by the primary detection unit, at S62, the mixed colours and polymer bales can either enter the secondary recycling facility 30, and bales will be broke open and then sorted by standard NIR detection into material groups as follows:

1. Mixed colour HDPE
2. Mixed colour PET
3. Mixed colour PP and as described above in relation to S32 of FIG. 1. Alternatively, or in addition thereto, the method 10 involves the use of a secondary mark detection unit, at S64, which will be programmed accordingly not to recognise primary manufacturer dots 50a-50n, but only secondary marks 70a-70n, and thus separating the single source material groups (from S62) into brands, for example, HDPE brand A bottles will be detected and ejected by a UV, NIR and/or IR readable orange square at S66. Equally, HDPE brand B bottles will be detected and ejected by a UV and/or IR readable red triangle at S66. For example, PET brand C bottles will be detected and ejected by a UV and/or IR readable grey circular sector at S68, and PP bottles siloed at S71.

These segregated bottles, now sorted by manufacturer and brand, can then sorted by standard NIR detection into further material groups before granulation S72, washing/drying S74 and compounding S76 before being reutilised as new products 100. The secondary detection at S64 does not need to detect by polymer-type only, but by UV, NIR and/or IR readable multi-colours associated to brands, not manufacturer 20, although the separation can be via other attributes or characteristics of recycled product 100, as described below in relation to FIGS. 5 and 6.

Figure 4A:
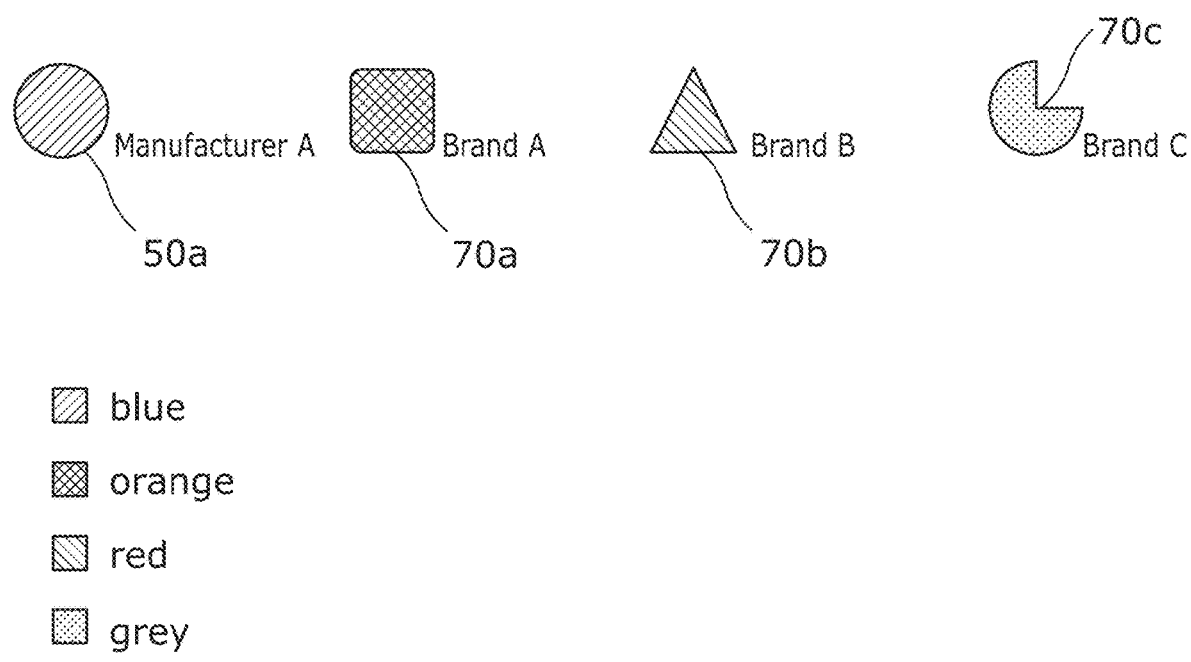
FIGS. 4a and 4b are schematic views, showing how the taggants of the second embodiment can be presented on the recyclable product itself, or on a separate label for subsequent securement to the product, respectively.

FIG. 4a shows how the trace marker or taggant 102 of the present invention can be applied to the product 100 as two dots, namely primary manufacturer dot 50a-50n and secondary dot 70a-70n which, in a preferred embodiment, is applied using continuous inkjet printing techniques at S16 of FIG. 1. In the example shown in FIG. 4a, primary dot 50a is a blue circle which is associated with primary manufacturer A. Secondary dot 70a is an orange square which is associated with brand A of primary manufacturer A. Secondary dot 70b is a red triangle which is associated with brand B of primary manufacturer A, and secondary dot 70n is a grey circular sector which is associated with brand C of primary manufacturer A.

The skilled person will appreciate that should the product 100 not be detected by the UV, NIR and/or IR detector as S28, an operative at the MRF/PRF 26 will know to separate the product 100 manually by simply interpreting the shape and/or colour of the primary dots 50a-50n and secondary dots 70a-70n. Again, the examples shown in FIG. 4a are only a subset of a much larger group of shapes and colours that could be utilised, and is for illustrative purposes only.

Figure 4B:
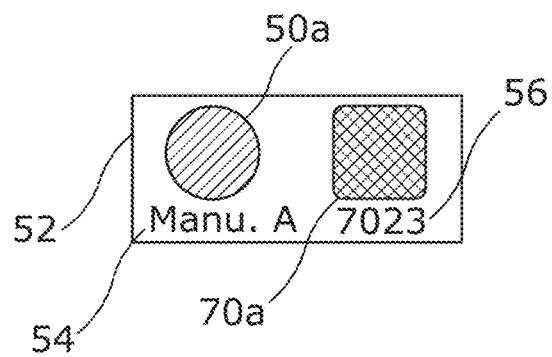

FIG. 4b also shows that the primary dots 50a and secondary dots 70a-70n can also be applied to the printed label 52 which is then adhered to the product 100 when in use. The printed label 52 also includes the manufacturer's name 54 and a RAL or Pantone code 56, which can be a four- or six-digit code, and which allows an operative to manually identify the product 100 without having to pass the product 100 through the detector.

Figure 5:
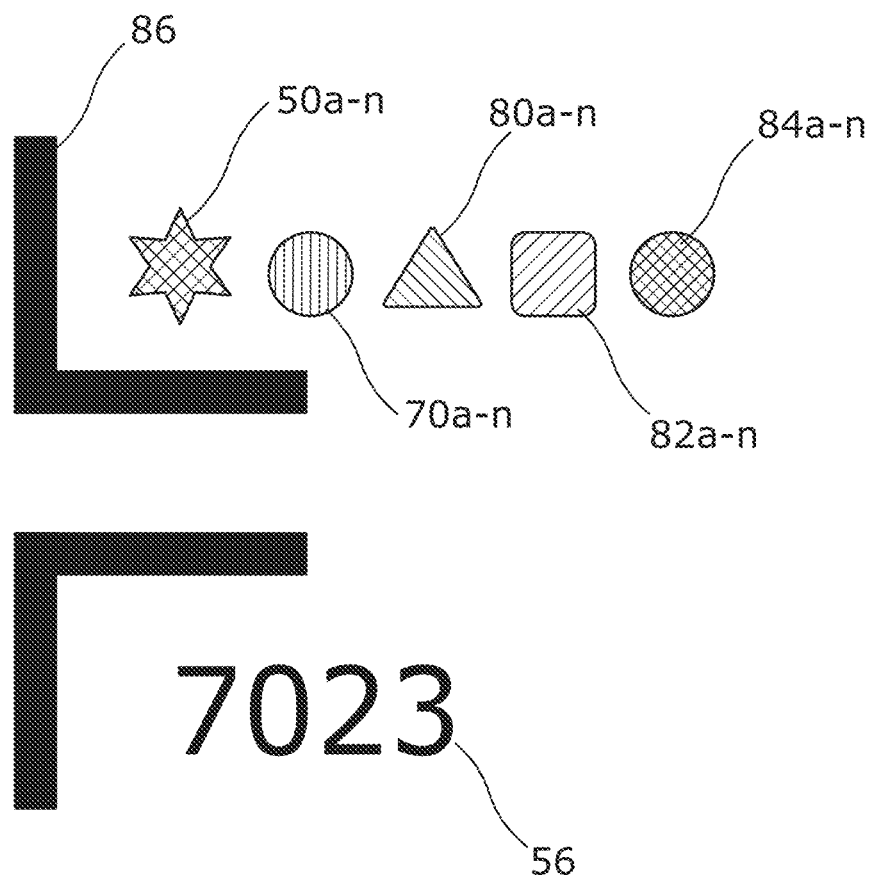
FIG. 5 is a schematic view representative of one style of registration for aligning and printing a plurality of taggants on the product, the plurality of taggants in this embodiment of the invention being representative of the originating source of manufacture, brand of product, base polymer manufacturer, polymer composition and grade, and which enables the subsequent separation of the recycled product based on these one or more attributes of the product.

FIG. 5 shows how the present invention can, instead of being utilised with just one or two uniquely identifiable trace markers or dots, use a plurality of dots to indicate the source of manufacture 20, base polymer manufacturer, polymer material, material grade, and brand of product, and which enables the subsequent separation of the recycled product 100 to be based on one or more attributes or characteristics of the product 100. FIG. 5 shows one style of registration for aligning and printing the plurality of dots in a string on the product 100, the plurality of dots in this embodiment of the invention being representative of the originating source of manufacture 50a-50j, brand of product 70a-70d, base polymer manufacturer 80a-80j, polymer material 82a-82d and material grade 84a-84d, and which enables the subsequent separation of the recycled product 100 based on one or more attributes of the product 100, as shown in FIG. 6.

FIG. 5 also illustrates one style of registration mark 86 for aligning and printing the plurality of dots on the product 100. Like that discussed in relation to FIGS. 2 and 4, the string of dots can also include a RAL or Pantone code 56, which can be a four- or six-digit code, and which allows an operative to manually identify the product 100, or attributes of it, without having to pass the product 100 through the detector.

Figure 6:
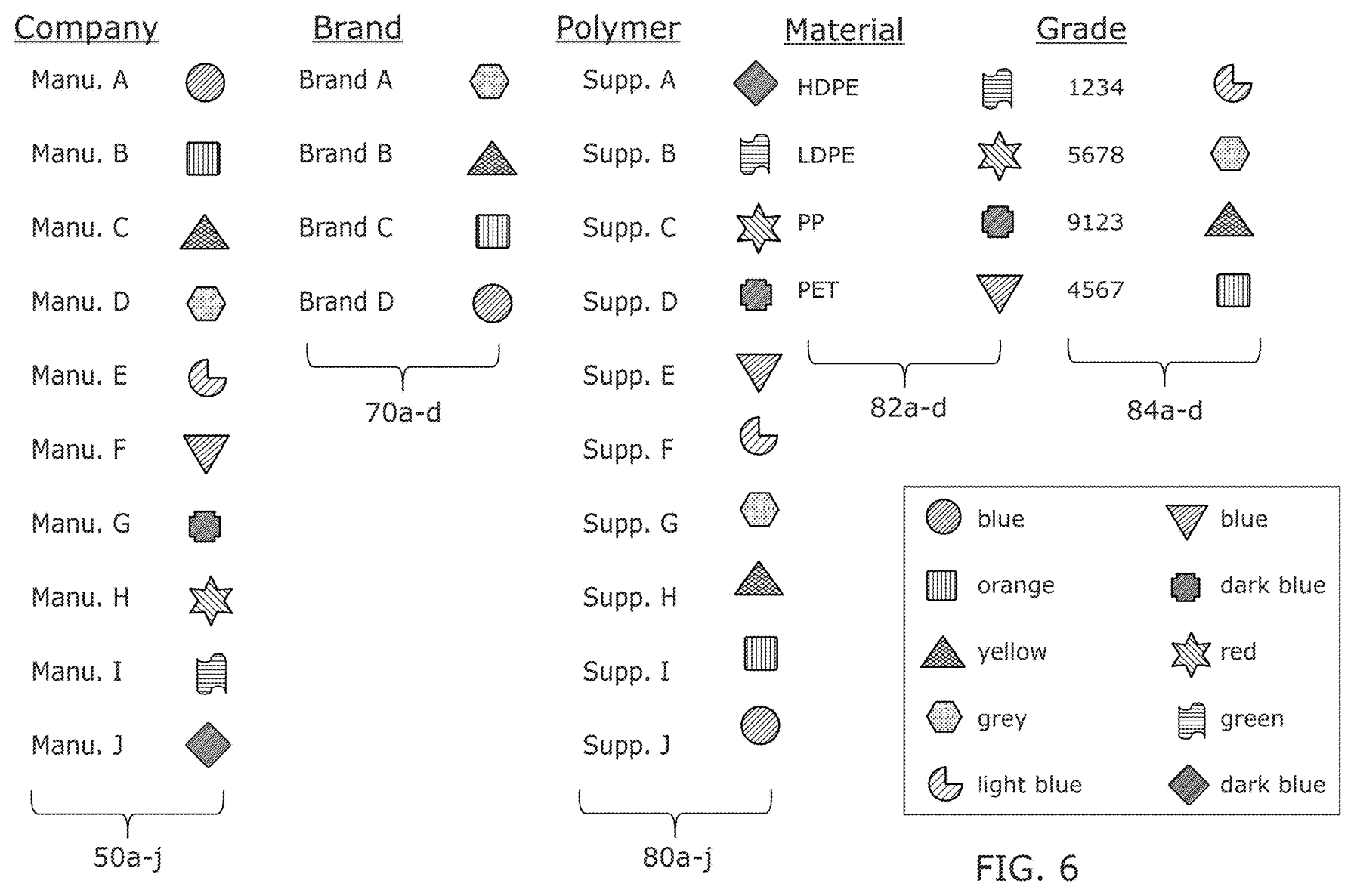

FIG. 6 show illustrative examples of how the plurality of dots shown in FIG. 5 can be configured on the product 100 when in use.

Figure 7:
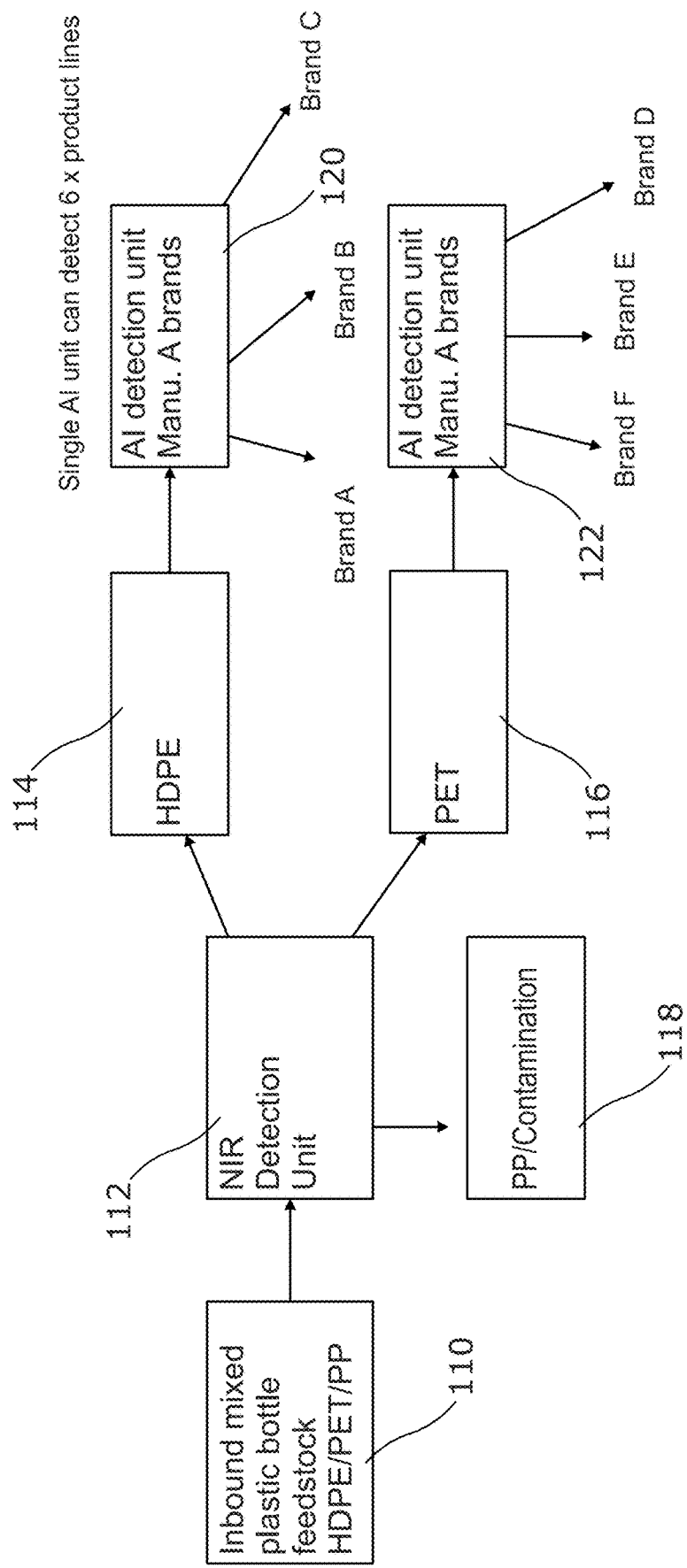
FIG. 7 is a flowchart showing the various steps of a method for recycling a recyclable material or product to its originating source of manufacture through the use of artificial intelligence in accordance with a third embodiment of the present invention.

FIG. 7 shows a third embodiment of the closed loop recycling method 10. The method 10 of the third embodiment is very similar to that of the first and second embodiments and corresponding features have been given the same reference numerals. The third embodiment differs from the first and second embodiments in that instead of separating the products 100 at the MRF/PRF 26 based on the detection of a primary dot 50a-50n signifying the source of manufacture 20, and then additionally a secondary dot 70a-70n signifying the brand of the product 100, the products 100 are separated through the use of artificial intelligence. The advantage of this being that the product 100 does not necessarily need to have a trace marker or taggant 102 applied.

FIG. 7 shows further detail of such a fully automated detection method. It describes only part of the closed loop recycling method 10 that is described in FIG. 1, and replaces S24-S38 shown in FIG. 1.

In FIG. 7, at S110, a mixed bottle feedstock is received at the PRF 26 or secondary processing facility 30 for sorting. S112 involves using standard near-infrared detection techniques to sort the mixed bottle feedstock into their polymer compositions. As shown for illustrative purposes in FIG. 7, at S112, the bottles are optically sorted into one of, for example, three polymer types: HDPE 114, PET 116 or PP 118.

In a continuous process, a single artificial intelligence (AI) unit detects the pre-sorted bottles and acts as a primary detection and pick by removing bottles by the shape, brand and colour of one manufacturer 20. For example, at S120, the HDPE bottle feedstock is then sorted into three streams based on the recognition of brands A, B and C of manufacturer A. S122 involves simultaneously sorting the PET bottle feedstock into three streams based on the recognition of brands D, E and F of manufacturer A. As before, the separated streams of polymer types are then granulated/shredded prior to washing/drying, and the shredded flakes compounded (not shown in FIG. 7). The sorting steps therefore define the polymer group and its physical properties, such as melt flow index, tensile strength, flexural modulus etc., for upcycling as new bottles.

In is envisaged that a number of photographic images, or a number of the actual crushed bottles, are supplied to the AI unit allowing the camera and processor of the AI unit to then learn the geometry and features of each bottle type. The neural network processor of the unit then learns the key features and parameters of each bottle type, and the trained neural network processor is then able to select target bottles and robotically pick them out vertically from the conveyor out as they pass under the camera using an integrated robot at a high rate of picks a minute. By capturing a large number of crushed bottle images, more reliable selections will be achieved.

The artificial intelligence detection methodology and system described herein can be used to improve detection of relevant products through the UV, NIR and/or IR dots, and/or by geometry, size and shape of the product and/or by logo design, branding, and alphanumerical code. The artificial intelligence detection methodology and system described herein can also detect products marked with a 1D, 2D or 3D data matrix, barcode and QR code, or any other suitable industrial alpha, numerical or alphanumeric coding process, as described below in relation to FIG. 8. The AI unit can therefore deal with a pre-sorted product feedstock based on the detected trace marker or taggant 102, as described above, or an integrated or combinational detection methodology and system is envisaged that can pick target bottles out from a mixed feedstock as they pass under the camera or detector at a high rate of picks a minute based on the trained database of digital images of the recyclable products and/or the detection any of the optical UV/NIR or IR trace signatures described herein.

Figure 8:
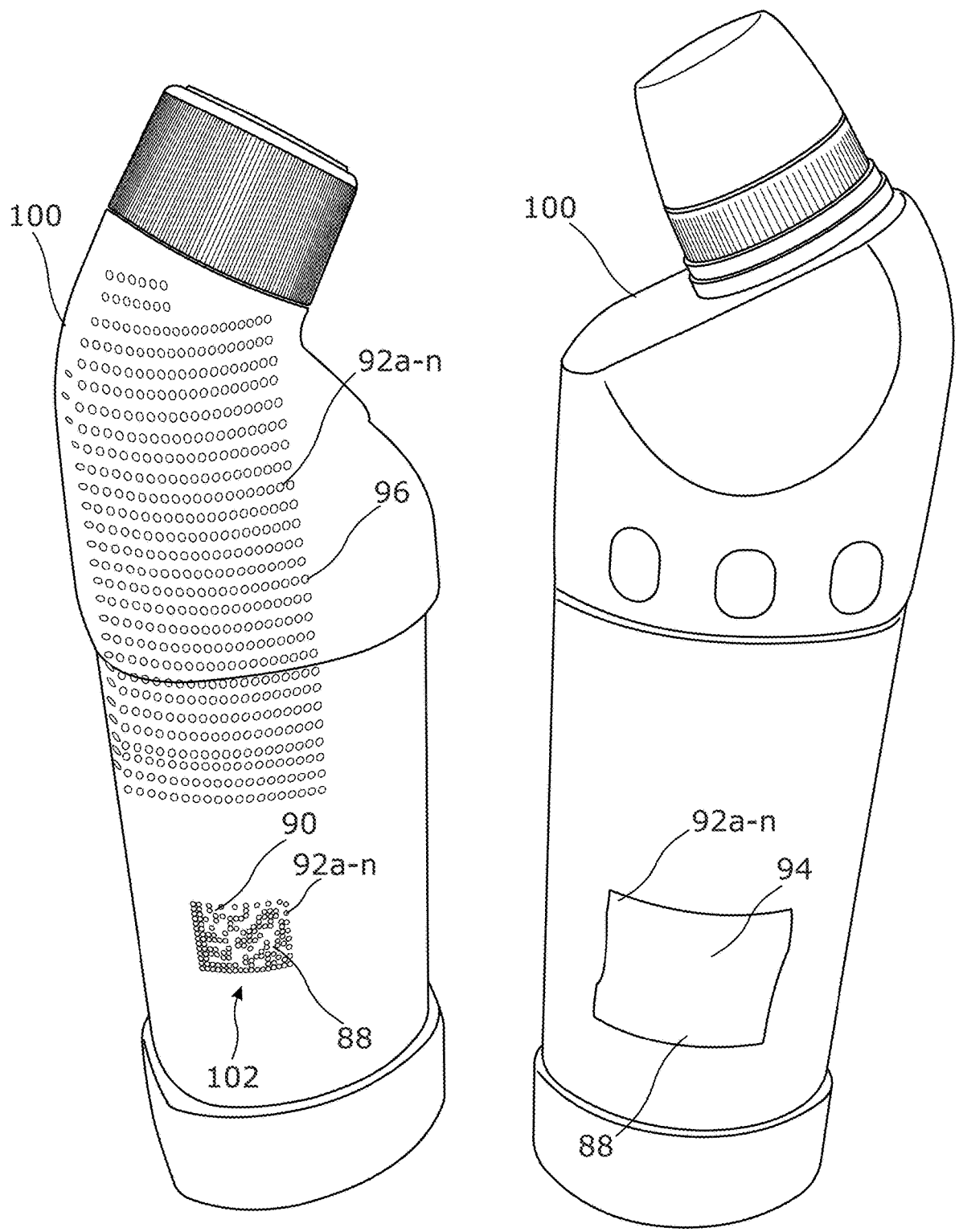
FIG. 8 shows further schematic views of examples of how an intelligent trace marker or taggant of the present invention can be applied on a recyclable product.

FIG. 8 shows how the trace marker or taggant 102 of the present invention can be applied in the form of a printed code 88 to a recyclable product 100. As described herein, such printed code 88 can be detected at the MRF/PRF 26 or at a secondary processing facility 30 for separation and onward recycling back to the originating source of manufacture 20, and/or based on one or more attributes of the product 100, e.g., sorting by brand, polymer material, material grade and/or colour.

FIG. 8 shows one example of a trace marker or taggant 102 being applied as a printed code 88, and more particularly, in the form of a 2D data matrix code 90, to the recyclable product 100 shown in the left hand side of FIG. 8. The 2D data matrix code 90 being applied to the product 100 using continuous inkjet printing. For ease of detection by current near-infrared detection technologies, the 2D data matrix code 90 shown in FIG. 8 is printed using UV ink and which is readable using standard NIR detectors at the MRF/PRF 26 or at a secondary processing facility 30. In the illustrative example shown in FIG. 8, the UV ink fluoresces red to aid detection and reading during the recycling process. Other colours can be read, and light array upgrades to current near-infrared (NIR) detection technologies will be required. There are inks available that can combine the properties of both UV/IR, for example. In particular, they can excite at the lower UV spectrum for UV detection and reading of data matrix code 90, for example, and then excite at a higher wavelength for detection by incumbent optical NIR detection at MRF/PRF 26 for onward separation by fluorescing the colour by brand, manufacturer etc. Therefore, separate information can be read from the same data matrix 90, i.e. the data stored in the data matrix code 90 can be read at one excitation wavelength and the colour of fluorescing by manufacture/brand at a second excitation wavelength for ejection, retrieval and recycling, and in these circumstances only one data matrix code 90 would be required.

The skilled person will appreciate that the data matrix 90 can also be read immediately after manufacture of the product 100 or at any point during its transportation, utilisation and disposal, and at any point before the recycled product 100 is granulated/shredded. When read at a detector, which could even be a handheld reader, the data gathered at any point in the lifecycle of the product 100 can be transferred to a corporate network or cloud-based system to provide the manufacturer 20 with an large data set which can be processed using a variety of processing techniques to extract and transform information for further commercial use and planning during the manufacture, transportation, distribution, utilisation and recycling of the product 100.

Therefore an embodiment of the invention is provided utlising a random pattern of printed UV/IR/NIR coloured data matrix codes 90 disposed on the product 100. The data matrix 90 allows key analytics to be stored and recovered when read, with the data matrix 90 itself being a UV/IR/NIR fluorescing colour block that could then be detected by new, incumbent or upgraded optical systems at the MRF/PRF 26 or via reverse vending systems for brand retrieval and onward recycling. This means that a combination of information can be stored on the product 100 and that that it would be possible to read the one colour mark for obtaining the information stored in the data matrix 90, and then separate the products 100 based on manufacturer/brand etc. by detecting the fluorescing colour of the data matrix 90 itself.

The printed code 88 shown at the right hand side of FIG. 8 can comprise a generally square solid marker 94 being sized approximately 30 mm×30 mm on product 100. Although not shown in FIG. 8, the printed code 88 is applied in pairs on opposing surfaces of the product 100. The skilled person will appreciate that if each of the plurality of dots 92a-n forming the printed code 88 is printed, a substantially solid marker 94 will be applied to the product 100, and such marker 94 can be detected at the MRF/PRF 26 or at a secondary processing facility 30 for separation and onward recycling back to the originating source of manufacture 20, and/or based on one or more attributes of the product 100, e.g., sorting by brand, polymer material, material grade and/or colour, as described herein in relation to FIGS. 1 to 6.

In addition, the printed data code 88 can be used in conjunction with the colour and shape identification, brand, material spectral or taggant markers described herein to provide additional data representative of one or more attributes or characteristics of the product 100 when embodied as a 1D, 2D or 3D data matrix, barcode and QR code, or any other suitable industrial alpha, numerical or alphanumeric coding process. This data embodied in the printed code 88 could include, for example, manufacturer 20, brand, colour, polymer composition, manufacturing location, manufacturing date, expiration and/or other relevant date stamps (in Julian or Gregorian format), anti-counterfeiting measures, regulatory compliance etc., and the information contained therein, when read at a detector can be transferred/to from the MRF/PRF 26 to a corporate network or cloud-based system. Such data set being incredibly useful in terms of managing the flow of recycled material 100, and primarily the data can be used for resource planning, as the manufacturer 20, for example, is able to quantify almost in real time how much feedstock it has (total quantity, type, brand etc.) at various MRF/PRF sites 26 or at secondary processing facilities 30, for subsequent reutilisation. In addition, the data set contained with the intelligent printed code 88 can also be used to monitor sales and marketing activities and promotions, and how they influence consumption and lifecycle of the product 100.

The skilled person will also understand that the necessary print quality of data matrix codes 90 and ensuring that the read data is checked or verified is defined by various International Standards, including ISO/IEC 15415 and ISO/IEC 16022. In the preferred embodiment, it is important that the UV/IR/NIR data matrix 90 is printed as an A or B grade quality data matrix 90 on the bottle 100, as demanded by manufacturers and retailers, as this allows a certain amount of redundancy through the consumer and recycling cycle as data matrix 90 allows inbuilt error correction as the marks get damaged through this cycle the data matrix code 90 may drop to a C grade by the time the product 100 reaches to the optical data matrix detector/reader at MRF/PRF 26, or any other suitable location 30 for reading. The inbuilt verification of a data matrix 90 ensures compliance with these industry standards and this will be invaluable to read and decode the data matrix 90 for PRN, PERN and/or EPR regulatory compliance. The decoded data could then be transferred from our data storage system/cloud to a blockchain network allow further transfer to regulatory bodies both in the manufacturer's home country and overseas.

Equally, a spaced array 96 of dots 92a-n of any shape and configuration can equally be envisaged, as shown in the left hand side of FIG. 8. Such an array of dots 92a-n permitting detection by shape and colour by manufacturer 20, brand, rheology and colour etc. as described above, but also the position and incidence (at specific X, Y coordinates on the product 100) of the dots 92a-n in a data matrix carries additional data representative of one or more attributes or characteristics of the recyclable product 100.

The detection of the printed code 88 can be read on standalone system, or possibly in conjunction with the optical detection system for spectral marker separation, as described herein. The aforementioned codes 88 being also be UV/IR/NIR coloured to associate to brands, e.g., yellow is brand A, blue is brand B, as with the preferred of embodiment of the invention.

Such intelligent markers or printed codes 88 that can be used in conjunction with standard shape and colour markers by brand, manufacturer 20 etc. as described herein can also be provided by upconverting phosphors of microscopic ceramic particles that provide a colour response when excited by 980 nm invisible light. When these upconverting particles are illuminated with an infrared light in NIR/IR conditions, they emit a coloured light that is visible to the human eye and incumbent optical detectors at MRF/PRF 26.

In addition, if FMCG/manufacturers 20 wanted to recover their bottles/packaging 100 irrespective of brand, polymer type or colour and they just required manufacturer's brand-specific mixed bales it would be possible to use UV or IR data matrix codes 90 in the following manner. Firstly, fluorescing the data matrix 90 to recover valuable data such as geographical location, consumer habits, anti-counterfeiting, PRN, PERN and/or EPR regulatory compliance, at one area or position of the conveyor, this data would be retrieved to a cloud-based portal, then further down the conveyor, at a second area or position, the incumbent optical detection at MRF/PRF 26 uses the fluorescing block of chequered colour in the data matrix code 90 for manufacturer assigned colour for ejection, retrieval and recycling, and in these circumstances only one mark 90 would be required.

The present invention also affords the opportunity to further mark baled manufacturer/brand specific recyclable products 100 after they have been sorted. This involves applying a machine readable code to baled products 100, the machine readable code fluoresces under excitation conditions to allow detection and recovery of the encoded data, the fluorescing shape or colour of the machine readable code also allows the detection of the manufacturer/brand of the product 100 to be quickly determined and the data shared to the cloud-based portal.

Figure 9:
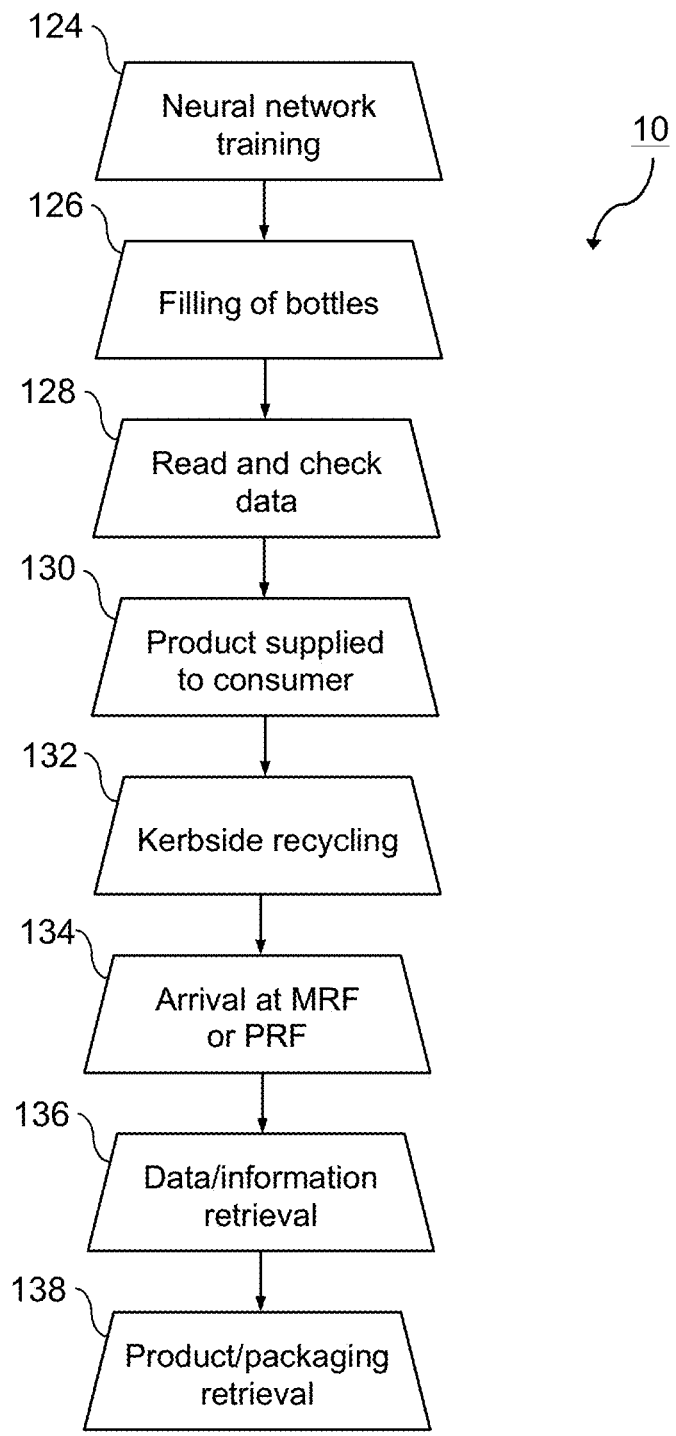
FIG. 9 illustrates a flowchart showing the various steps of a method for managing the flow of recyclable material or product using retrieved or recovered data, and optionally recycling the detected recyclable material or product, through the use of a combinational optical detection system which utilises spectral marker detection, barcode readers and artificial intelligence to detect the shape of the recyclable product in accordance with a fourth embodiment of the present invention.

FIG. 9 shows a fourth embodiment of the present invention. The method 10 of the fourth embodiment is very similar to that of the first, second and third embodiments and corresponding features have been given the same reference numerals. The fourth embodiment differs from the first, second and third embodiments in that instead of separating the products 100 at the MRF/PRF 26 based on the detected source of manufacture 20 and/or brand of the recycled product 100, and/or other detected identifiable trace markers or attributes, data is instead retrieved from the products 100 in a number of different ways, including through the use of artificial intelligence. This retrieved data can be transmitted back to the manufacturer 20 in real time, or near real time, to allow the manufacturer 20 to make informed decisions around the return of their materials 100 into the circular economy.

The method 10 commences at S124, where a neural network processor connected to an AI-enabled video camera learns the key features and parameters of each product 100 type. The brand and logo assigned packaging 100 is presented to the AI-enabled bottle shape camera to develop a library of images for pre- and post-consumer use, also pre- and post-recycling phase the library of images provided will show production quality products and post-consumer and recycling phase products 100. The skilled person will understand that the pre- and post-recycling phase products will often be damaged, crushed and distorted; and the camera will train the neural network to recognise distorted and damaged branding, logos and general features and geometry of partnering manufacturer's 20 packaging 100.

At S126, the manufacturer 20 or bottle filler fills the recyclable packaging 100. In a preferred embodiment, a red or orange UV 2D data matrix 90 is applied to the visible outer surfaces of the product 100, and/or a visible ink data matrix 90 is applied in unison to covered surfaces (e.g., beneath sleeves or labelling that will often be removed prior to recycling). By the same process, an assigned spectral marker taggant 102 is applied by brand, shape, colour, alpha, numerical or alphanumerical code 88 in UV ink for visible surfaces and/or visible ink on covered surfaces. All markers 102 are applied by a coding process to the outer surface of the bottle 100, or to sleeves and labelling during the printing stages or applied by coding sleeves or labelling.

At S128, the data matrix 90 and assigned spectral marker taggant 102 is validated. This is achieved using a machine vision camera that reads the data that has been applied to the custom data matrix 90 and forwards this information to a cloud-based portal in in readiness for subsequent pairing at the MRF and/or PRF 26 during the recycling and recovery phase (at S134).

The marked product 100 is then despatched from the manufacturer 20 to the end consumer, either directly, or through a retail network, at S130. The skilled person will appreciate that S126, S128 S130 can all occur at, or be coordinated from, the manufacturer's facility 20.

After use, at S132, the consumer then returns the bottle 100 through local kerbside recycling, and the collected product, at S134, is received at a MRF 24 or PRF 26 for sorting.

At S134, the product 100 is received at the MRF 26. At this point, the packaging 100 is separated with traditional methods separating of the mixed recyclables; the polymer fraction of mixed polymers, namely HDPE, PET and PP is baled for onward recycling at a PRF 26. The reading and removal of brand assigned packaging can also be undertaken at MRF 26.

At S136, the product 100 is received at the PRF 26 and the data retrieved from the products 100. The detection method 10 of FIG. 9 is carried out using a retrofittable optical detection system 160 which utilises spectral marker detection, barcode readers and artificial intelligence to detect the shape of the recyclable product 100, and as set out in further detail in FIGS. 10 and 11.

At the PRF 26, the baled packaging is opened and liberated of any unwanted tramp materials: metals, paper, cardboards etc. The bottles 100 are then optically sorted using traditional NIR sorting technologies or any other suitable separation method into their desired single polymer steams: natural HDPE, PET clear and mixed coloured HDPE and PP streams. These materials drop from the optical sorters onto three separate conveyors travelling preferably, but not limited to, at under 2 metres per second.

At S136, the three-stage detection unit 140 identifies the packaging 100. A UV or white light camera 152 reads the UV red or orange, or visible ink, data matrix 90. The reading then correlates with the data applied during the marking stage (previously at S128 at manufacturer 20 or filler). If this data from the data matrix 90 cannot be retrieved because of damage, the detection unit 140 tries to identify the packaging 100 by the brand assigned UV or visible ink shape or colour marker or taggant 102 applied at the manufacturer 20 during, or in unison, with the filling stage (S126) using a UV spectral marker camera 154. An AI-enabled video camera 158 supports this information gathering and processing by trying to identify remnants of labelling or from the earlier trained database of images; all this information is constantly transmitted to the cloud-based portal enabling the manufacturer 20 to access the information and which allows informed choices to be made around the recycled packaging's 100 journey back into the circular economy, and as set out in further detail in relation to FIGS. 10 and 11.

At S138, the packaging/product 100 is retrieved. Robotic pickers, either operating through machine vision or artificial intelligence, under ambient, white or UV light conditions pick by the brand assigned shape and colour taggants 102, or alpha, numerical or alphanumerical code 88 or data matrix 90, as described herein. The recyclable product 100 can be retrieved from the conveyer 144 in a generally vertical extraction technique which minimises the risk of collisions with non-target material, and as would otherwise be the case with horizontally-actuated pusher-type devices known in the art.

The brand assigned colour and shape markers 102 can also be identified by higher speed incumbent optical sorters operating under UV or white light conditions, which allows the retrieval of the products 100. The material 100 can then be sent to the manufacturer's 20 recycling and compounding partner for ink marker removal, washing, size reduction and compounding into their technical parameters for re-use in new packaging.

Figure 10:
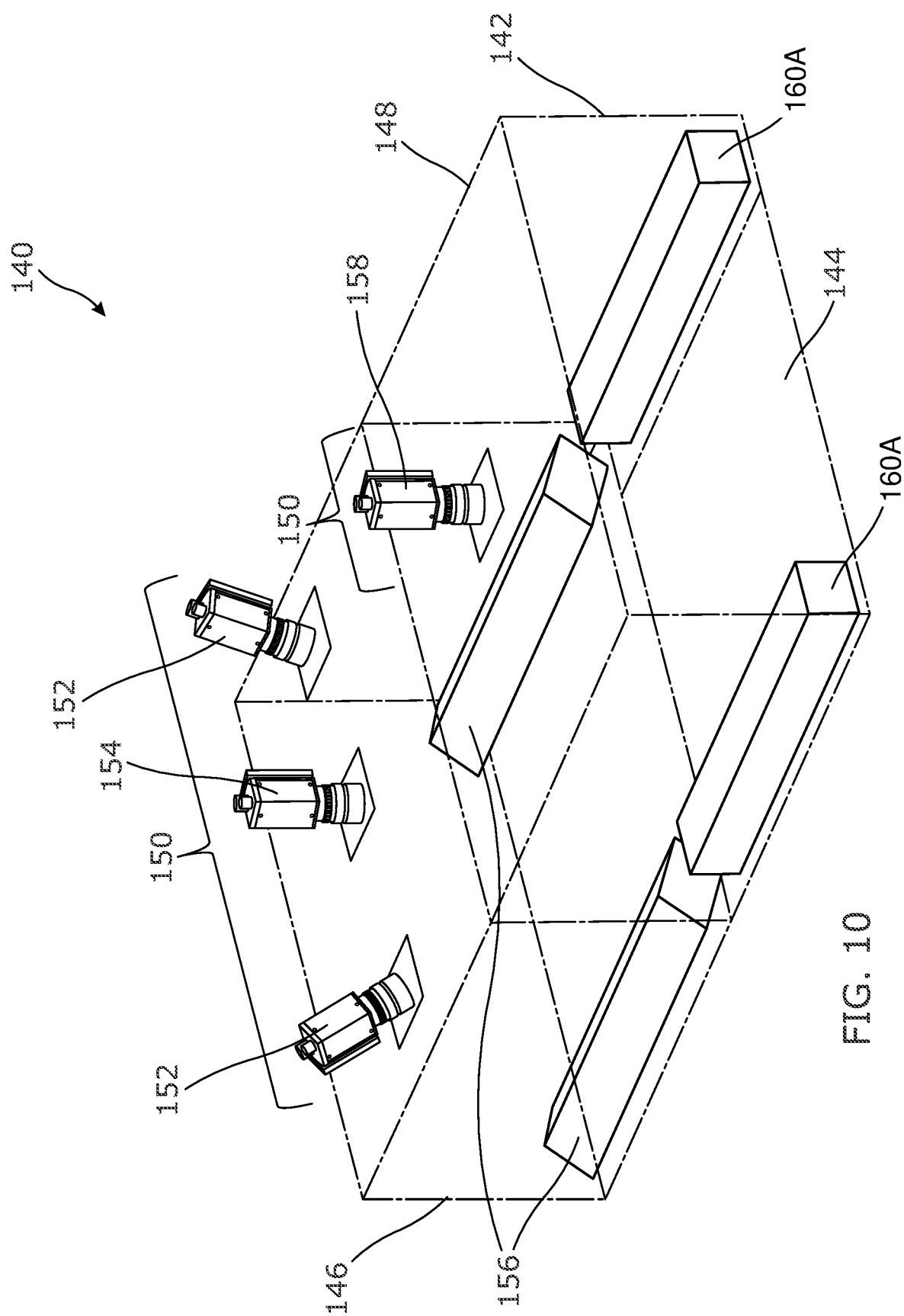
FIG. 10 shows a high-level schematic illustration of a data retrieval and detection unit which can be retrofitted to existing conveyer systems in accordance with the present invention.

FIG. 10 shows a schematic illustration of the data retrieval and detection unit 140 which can be retrofitted to existing conveyer systems and used at the MRF/PRF 26 in accordance with the present invention. The detection unit 140 forms part of a detection and data retrieval system 160 that can be connected to a local network and to a manufacturer's 20 remote corporate network or cloud-based system, as shown in further detail in FIG. 11.

At the MRF/PRF 26, the detection unit 140 is an enclosure 142 positioned over the conveyors 144 on which the recyclable products 100 are conveyed. In a preferred embodiment, the recyclable products 100 are conveyed such that they enter the first detection zone 146 and then successively the second detection zone 148. This is in no way intended to be limiting, as the order in which the shape and colour taggants 102, or the alpha, numerical or alphanumerical codes 88 or data matrix 90 applied to the outer surface of the products 100, and the detected shape of the recyclable products 100, as detected inside the detection unit 140 can be changed.

The detection unit 140 utilizes a machine vision (optical) camera detection system 150 which will, in a preferred embodiment, contain two detection zones, namely, a first detection zone 146 operating under UV conditions which can read both UV data matrix 90 and brand assigned colors and shapes 50, 70, 80, 82, 84, 102, as described herein. The machine vision camera detection system 150 comprises at least one UV or white light camera 152 that reads the UV red or orange or visible ink data matrix 90. In a preferred embodiment, the UV or white light cameras 152 are 2D barcode readers. The reading then correlates with the data applied during the marking stage (previously at S128 at manufacturer 20 or filler). If this data from the data matrix 90 cannot be retrieved because of damage, the machine vision system 150 tries to identify the packaging 100 by the brand assigned UV or visible ink shape or color 50, 70, 80, 82, 84, 102 applied at the manufacturer 20 during, or in unison, with the filling stage (S126) using a second UV optical detector 154. In a preferred embodiment, the first detection zone 146 being illuminated with UV light using UV bar lights 156.

The second detection zone 148 of the unit 140 also contains a machine vision (optical) camera detection system 150 comprising an AI video camera system 158 which looks for remnants of labelling and possible bottle shape and color. The skilled person will know that most labels fall off during the recycling process, and bottles 100 are often crushed beyond distinguishable recognition, but the AI video system 158 effectively acts as a fail-safe and it can effectively identify the shape of crushed, conveyed recyclable products 100, as outlined in further detail in relation to FIG. 14. The second detection zone is, in a preferred embodiment, illuminated by white diffused bar lights 160A.

Whilst in the preferred embodiment the AI-enabled cameras 154 and 158 operate in UV light and white diffused light in the first and second detection zones 146, 148, respectively, this is in no way intended to be limiting as the AI-enabled cameras 154, 158 can operate with ambient light, white or diffused light, or UV light or a combination of the aforementioned spectra within one detection unit 140.

Figure 11:
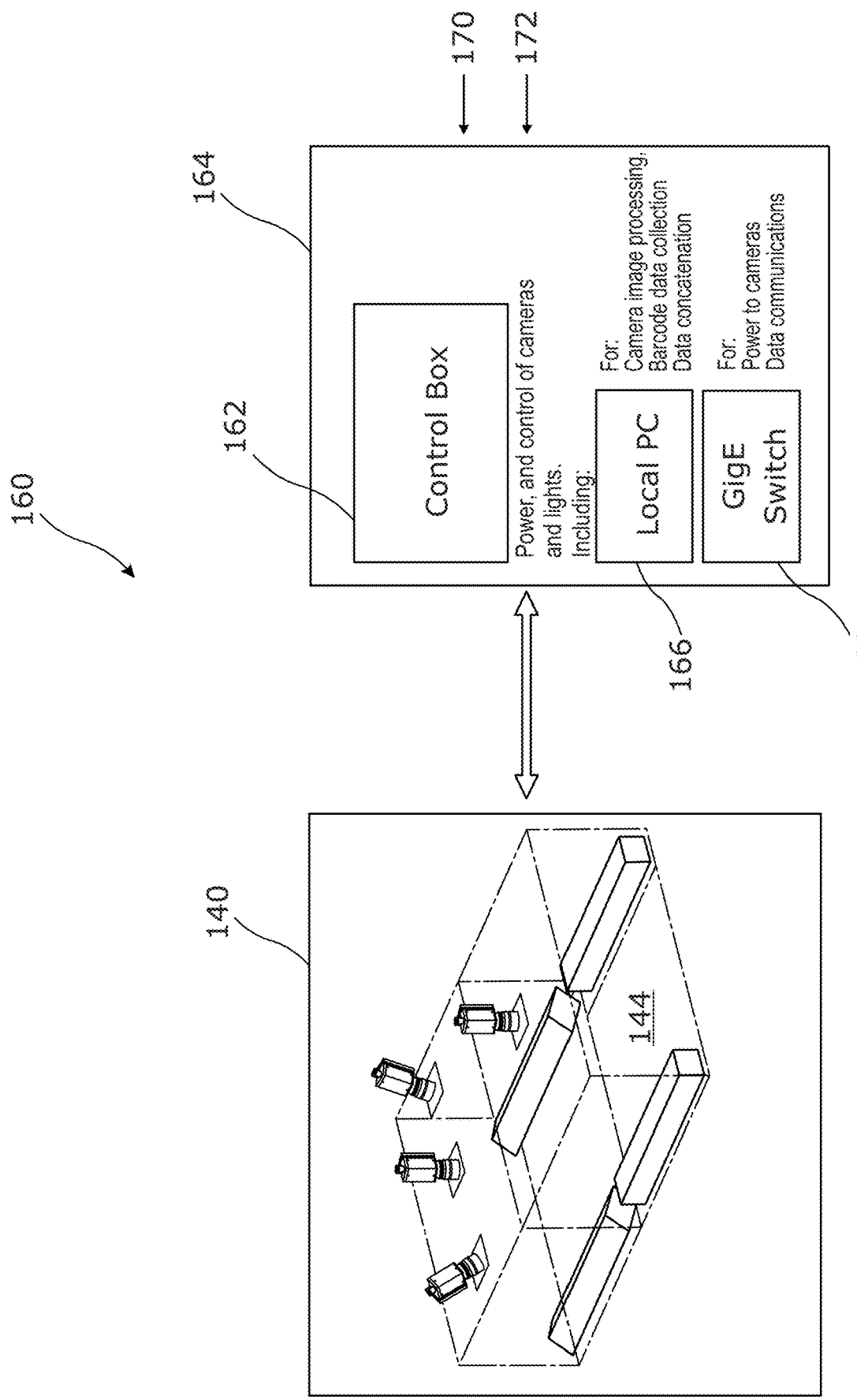
FIG. 11 is a high-level schematic illustration showing how the data gathered by the data retrieval and detection unit of FIG. 10 can be connected to a local network, and to a remote corporate network or cloud-based system.

Referring to FIG. 11, the detection unit 140 forms part of a detection and data retrieval system 160 that can be connected to a local network and a manufacturer's 20 remote corporate network or cloud-based system. As shown schematically in FIG. 11, the various camera systems 152, 154, 158 are connected to a control unit 162 which can be housed in an enclosure or housing 164. The skilled person will appreciate that FIG. 11 is a schematic diagram of the hardware configuration and, in order to aid clarification, many other circuit elements are not shown.

The control unit 162 controls the power to the various camera systems 152, 154, 158 and the lighting 156, 160A. The control unit 162 includes a local personal computer (PC) 166. As shown schematically in FIG. 11, the local PC 166 receives a number of inputs from the various camera systems 152, 154, 158 via a GigE interface switch 168. The local PC 166 can be considered a self-contained system with CPU, memory and peripherals that can be used to process the data received from the various camera systems 152, 154, 158 and output information to the MRF/PRF 26 and/or manufacturer 20 via a number of outputs.

Connection to other input/output peripherals and/or other wirelessly-connected devices is enabled using wireless transmission protocols, such as, for example, Wi-Fi (IEEE 802.11 standard), Bluetooth or a cellular telecommunications network would also be appropriate, and/or by utilising near-field communication (NFC) protocols. In addition, the skilled person will appreciate that the control unit 162 could be connected to other external devices, via wired network connection 172.

Updates or further content to the software controlling the detection and data retrieval system 160 can be downloaded to the local PC 166 via local USB port interfaces, or wirelessly using Wi-Fi, Bluetooth, a cellular telecommunications network or NFC antennas, or via network connection 172. In a preferred embodiment, the control unit 162 is powered by an external AC power source 170 and is connected to the local network via connection 172. The data gathered by the detection and data retrieval system 160 of FIG. 11 can be sent in real time, or near real time, to a remote corporate network or cloud-based system (not shown) utilising any number of interface and communication protocols known in the art.

As described above, the information that is retrieved from the detection unit 140 will enable manufacturers 20 and/or brand owners to better understand consumer habits, product cycle times, geographical location of recyclables 100, demographical strengths and weaknesses, etc. almost in real time.

The retrieved data will also facilitate PRN and EPR regulatory compliance. Quite rightly, a great deal of focus and emphasis has recently been placed on manufacturers 20 to contribute more to the cost of waste recovery. Data will be key to for government agencies, brand owners 20, and recycling and strategic partners to help quantify and understand, and importantly prove, where their products 100 are in the supply, consumption and recycling lifecycle.

Figure 12:
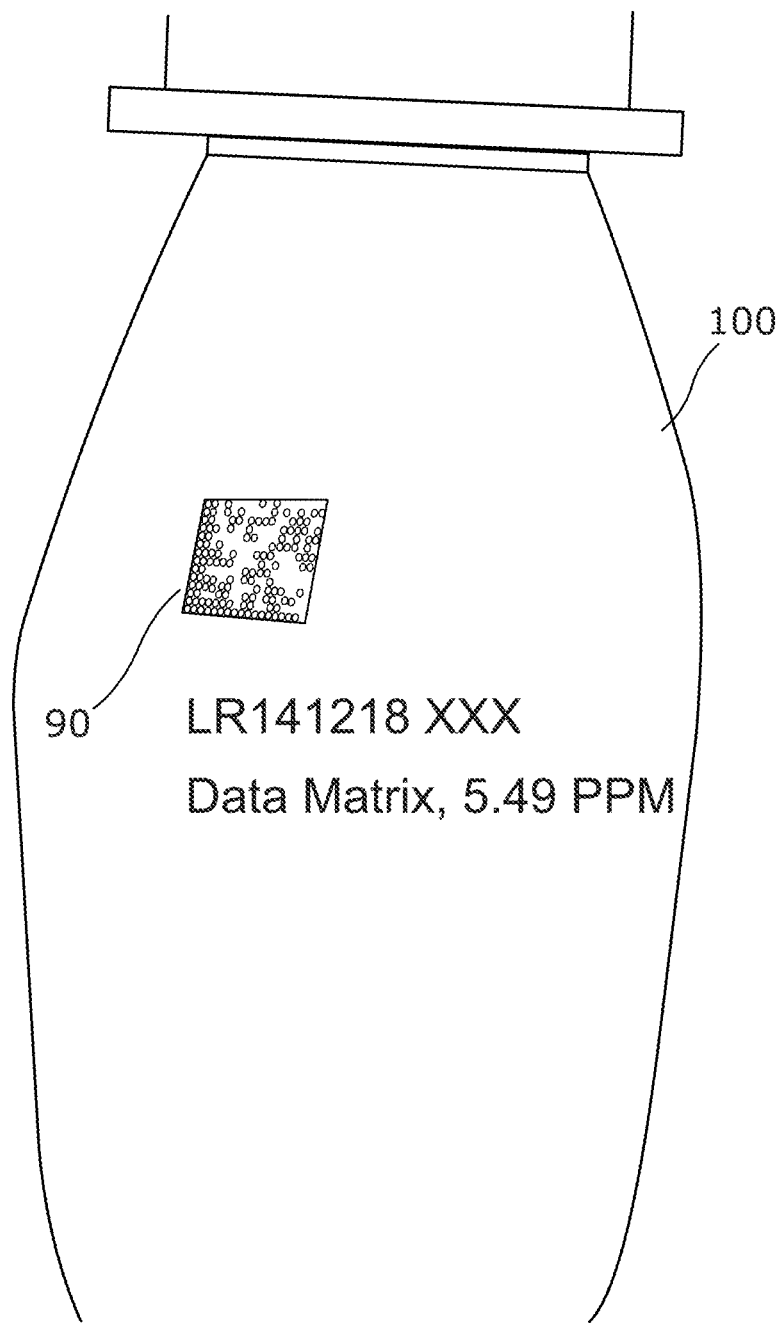
FIG. 12 illustrates a schematic view of a data image captured by the optical detection system of FIG. 10 and which has read and validated a 2D data matrix code applied to the outer surface of the recyclable product.

FIG. 12 shows a data image (screenshot) captured by the UV or white light camera 2D barcode reader 152 of the machine vision camera detection system 150 of FIG. 10, and which has read and validated a 2D data matrix code 90 which has been applied to the outer surface of the recyclable product 100. In the example shown in FIG. 12, the camera 152 has read a red or orange or visible ink datamatrix 90 which has been illuminated directly by a UV emitting or white light source 156, and has been read, checked and verified, as has been outlined above.

FIG. 12 shows a data image captured by the UV camera 2D barcode reader 152 and the resultant data retrieved from the data matrix 90 on crushed sleeved PET packaging 100, using a red and/or orange UV ink. Such red and orange UV inks have been found to significantly address the UV optical brightener issues which have been observed on some product's 100 labelling, and also due to residues from home and personal care products that can sometimes be encountered, and cause noise issues and colour interference. As can be seen from FIG. 12, the captured red or orange UV data matrix 90, and ones like it, even when distorted, damaged and in different orientations on the conveyor 144, all delivered a reliable and readable data matrix 90 utilising its inbuilt error correction capabilities.

In a preferred embodiment of the invention, the detection unit 140 which can be installed pre- or post-incumbent NIR optical sorter within the MRF/PRF 26 combines multiple cameras 152, 154, 158 in each unit 140 for two detection techniques. The phrase "pre-incumbent NIR optical sorter" shall be understood to means situating the detection unit 140 before the recyclable products 100 are sorted into separate polymer compositions using incumbent NIR detection techniques, as is shown at S28 of FIG. 1. Alternatively, it is also entirely possible to situate detection units 140 after the products 100 have already been segregated into separate polymer streams using incumbent NIR detection techniques (i.e., after S32 of FIG. 1), and this is what is meant by the phrase "post-incumbent NIR optical sorter".

The first detection zone 146 within the detection unit 140 combines multiple 1D and 2D barcode readers 152, preferably within an arc formation, and operating under UV light conditions to retrieve data from the 1D or 2D barcodes, QR codes or data matrix 90 for sharing to a suitable database or cloud-based technology. Within the same first detection zone 146 is UV optical detector 154 working with artificial intelligence capabilities which analyses bottles or packaging 100 on the conveyor 144 below it, to match bottles or packaging 100 to a manufacturer 20 or brand assigned UV shape and colour, alpha, numerical or alphanumerical code 50, 70, 80, 82, 84, 88, 102, as outlined below.

The barcode readers 152 are placed in an arc, as when the bottles 100 are initially marked (S126) the plane is flat. When baled during recycling, the data matrix 90 or 2D code is undamaged but a crease or fold within the bottle or packaging 100 changes its orientation to either the left or right, so two or more cameras 152 placed within an arc will increase detection rates.

The detection unit 140 can be placed either pre- or post-optical sorting technology, or installed as part of a new processing facility or retrofitted within incumbent infrastructure.

An alternative embodiment could see three of the units 140 being located post-optical sorter within the MRF/PRF 26 and analysing the outputs as below:
Line 1—HDPE natural—food packaging grade (principally milk bottle)
Line 2—PET clear and blue tint (principally water bottles)
Line 3—HDPE and PP coloured bottles (principally home and personal care products)

FIG. 13 shows a series of example data images captured by the UV optical detector 154 of the machine vision camera detection system 150 of FIG. 10, and which can detect and identify the manufacturer or brand of the recyclable product 100 based on the detected shape or colour of a spectral marker taggant 50, 70, 80, 82, 84, 102 applied to the outer surface of the recyclable product 10. This optical spectral marker detector 154, being located in the first detection zone 146, has artificial intelligence capabilities and analyses bottles or packaging 100 on the conveyor 144 below to match bottles or packaging 100 for manufacturer 20 or brand assigned UV shape, alpha, numerical or alphanumerical codes within UV colours 50, 70, 80, 82, 84, 88, 102.

FIG. 13 comprises three images: namely a) a data image obtained of a UV blue square taggant or marker 102 that has been applied to the outer surface of a product 100; b) a data image obtained of a UV red square taggant or marker 102 that has been applied to the outer surface of a product 100; and c) a data image obtained of a UV red circle taggant or marker 102 that has been applied to the outer surface of a product 100. Each of the images displays the degree of certainty, as a percentage, that the spectral marker 102 has been classified.

To identify different fluorescent shapes 102, an initial set of training images were used to firstly train the neural network to then recognise possibly distorted and damaged trace markers 102 of different shapes and colours. In the examples shown in FIG. 13, the training of the neural network was carried out with a relatively small number of training images and using red and blue UV inks printed as circles, squares and triangles on the outer surfaces of various test packaging 100.

Figure 13A:
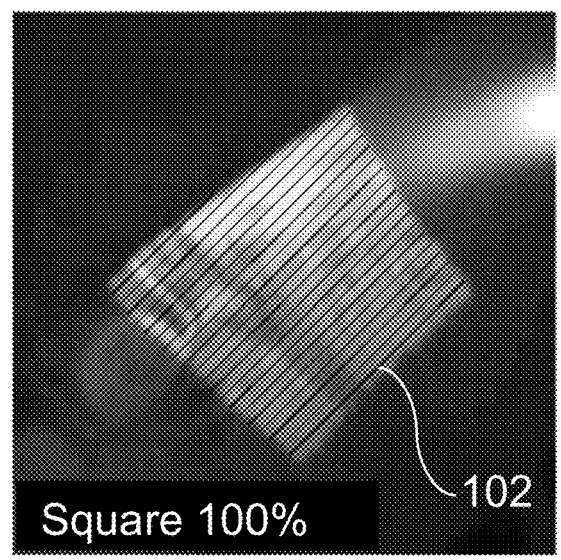
FIG. 13 are a series of example data images captured by the optical detection system of FIG. 10 and which can detect and identify the manufacturer of the recyclable product based on the detected shape of a spectral marker taggant being applied to the outer surface of the recyclable product using artificial intelligence capabilities.
Figure 13B:
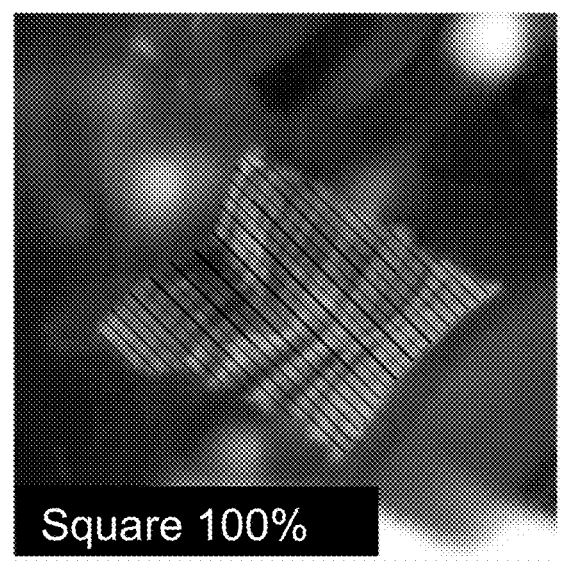
Figure 13C:
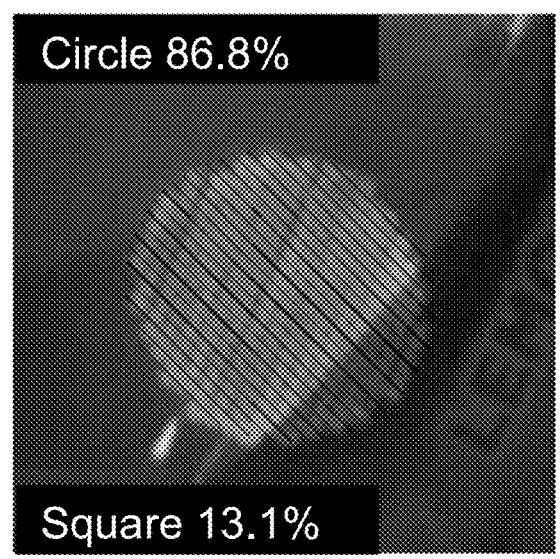
Figure 14A:
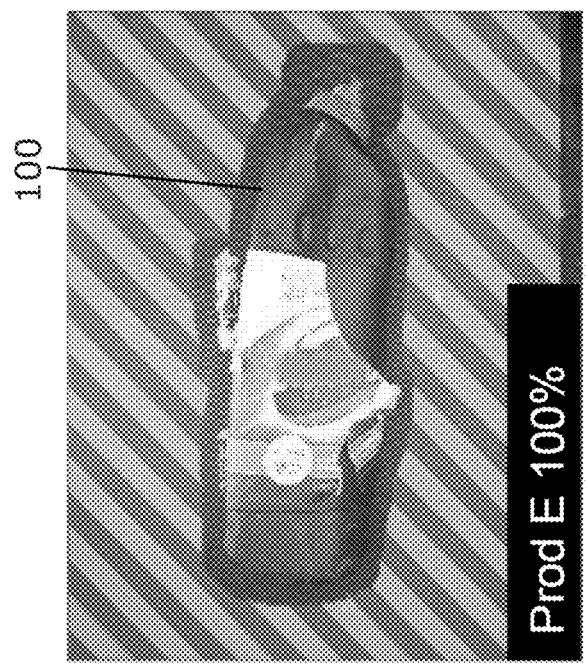
FIG. 14 shows a series of example data images captured by the optical detection system of FIG. 10 and which can detect and identify the brand of the recyclable product based on the detected shape thereof using artificial intelligence capabilities.
Figure 14B:
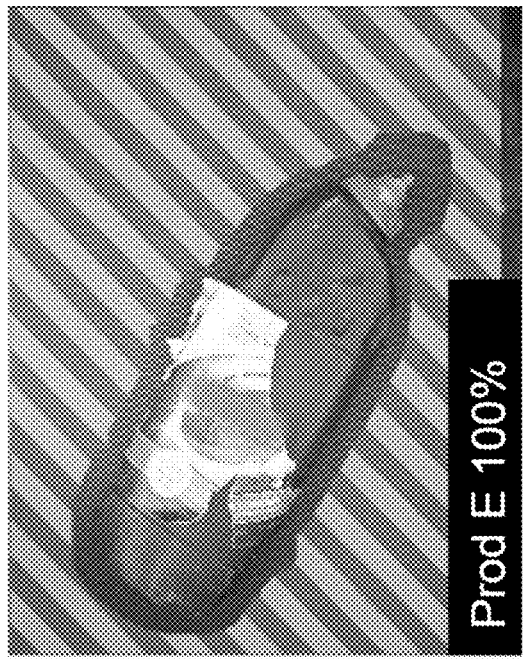
Figure 14C:
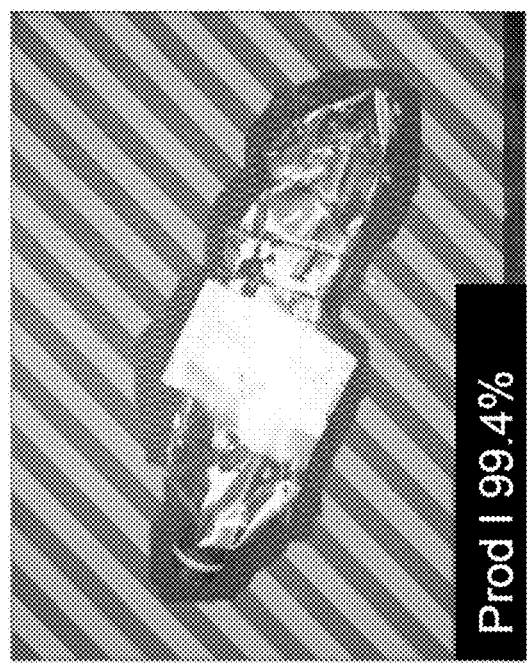
Figure 14D:
Figure 15A:
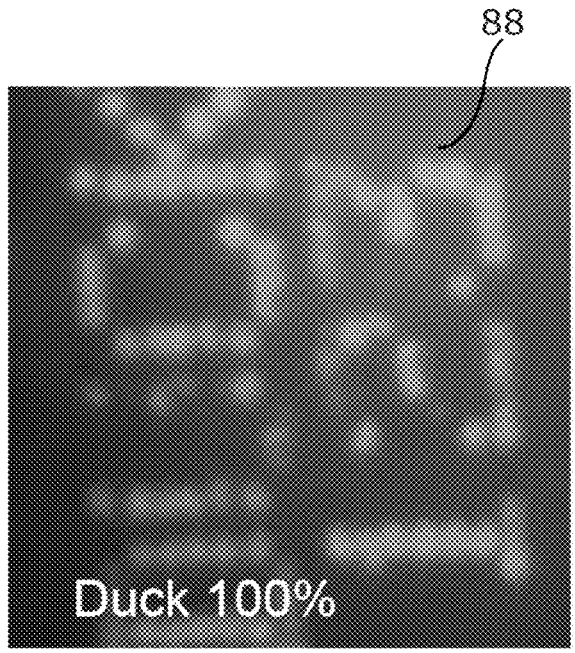
FIG. 15 shows data images of a series of alpha, numerical and/or alphanumeric taggants applied to the outer surface of the recyclable product and which have been detected and classified by the optical detection system of FIG. 10 using artificial intelligence capabilities.
Figure 15B:
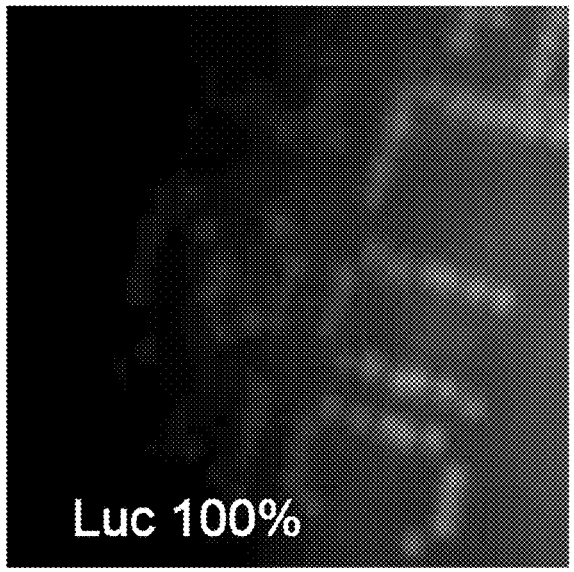
Figure 15C:
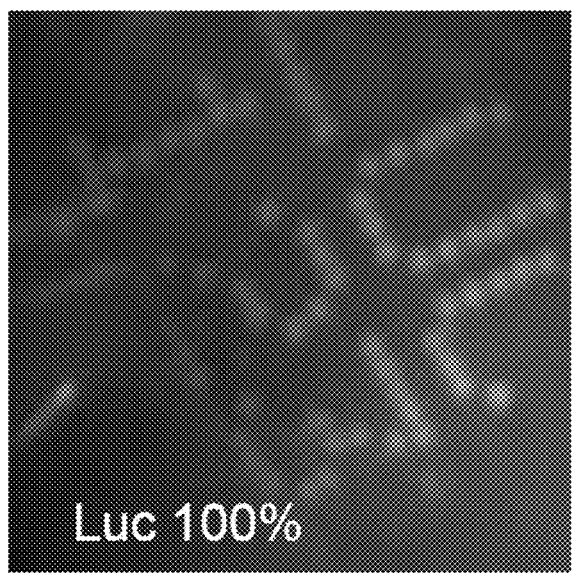
Figure 15D:
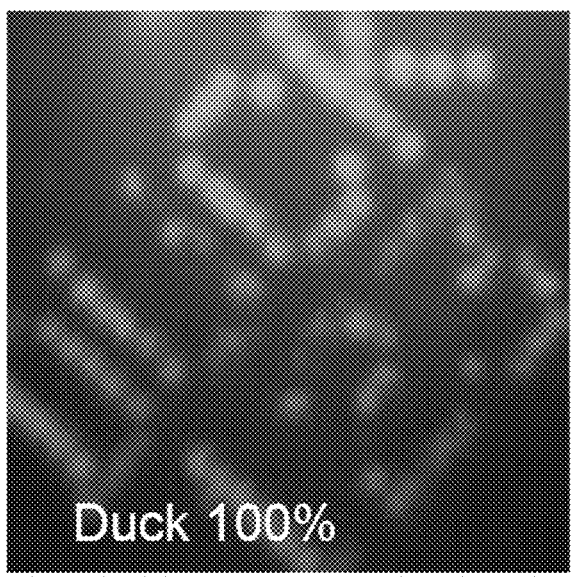

FIG. 13 shows a number of samples obtained by the optical spectral marker detector 154 and the system 160 can tell most shapes 102 apart and misclassifications in the initial trials were low. As might be expected, FIG. 13a, which is presented as a blue square 102 on the packaging has been 100% correctly classified by the system 160, as has the red square 102 of FIG. 13b even though the packaging 100 has been deformed to a greater extent. FIG. 13c has been correctly classified as a red circle 102 although the degree of certainty is less than 100%. Looking at FIG. 13c, it is possibly the case that the way the bottle 100 has been deformed causes the marker 102 to appear to fluoresce at different intensities (i.e., shadows) along a straight edge inside the circle 102. Any crushing or deformation of the product 100 along the straight edge would explain this behaviour. Even within a limited number of samples and training (examples of which are shown in FIG. 13 for illustrative purposes only), it is possible to build a reliable system for determining the manufacturer 20 or brands of bottles 100 based on the detected UV shape and colour, or alpha, numerical or alphanumerical codes.

FIG. 14 shows a series of example data images captured by the AI-enabled video camera 158 of the machine vision camera detection system 150 of FIG. 10 and which can detect and identify the brand of the recyclable product 100 based on the detected shape thereof using artificial intelligence capabilities.

Within the second detection zone 148, the artificial intelligence enabled cameras 158 (which are identical in hardware to the optical spectral marker detectors 154) working under white, diffused white or ambient light conditions, analyse packaging or bottles 100 for the remnants of labels, logos or branding of packaging and bottle including features or geometry and match them to a trained database of images. This part of the detection system 160 can also checks for manufacturer 20 or brand assigned shape, alpha, numerical or alphanumerical markers 102 within the visible spectrum.

In an initial trial, images were taken to verify that the system 160 is able to determine the brand of bottle 100 based on its appearance. For this trial, 15 different brands of bottle 100 were tested. After acquiring a set of images, the system 160 was trained on a sample of these in order to identify the different brands. Once the system has been trained, the images not used for training are used to test the results. A final set of images were then taken with more damage to various labels. These images were then used to test the system 160 on images it has never seen before.

The results of testing on unseen products 100 produced completely accurate results and the system 160 was able to accurately recognise distorted and damaged branding, logos and general features and geometry of partnering manufacturer's 20 packaging 100. FIGS. 14a to 14d shows various images obtained of the unseen products with the identified brand and degree of certainty shown in the bottom left hand section of each image. The hatching is a result of the background having been removed from the image. The skilled person will note that even highly-damaged products 100 have been classified correctly with a high degree of certainty.

The skilled person will appreciate the significant advantages that the three-stage detection unit 140 described above provides. UV cameras 152 continuously read the UV data matrix 90 on the conveyed recyclable product 100. If the data from the data matrix 90 cannot be retrieved because of damage, the detection unit 140 attempts to identify the product 100 by the brand assigned UV ink shape or colour applied at the manufacturer 20 or filler, using artificial intelligence capabilities and UV spectral marker camera 154. The AI-enabled video camera 158 effectively acts as a fail-safe and it can effectively identify the shape of crushed, conveyed recyclable products 100 by identifying remnants of labelling or from the earlier trained database of images of crushed product. Such a detection method and system ensures that all products 100 are detected and this information can be constantly transmitted to the cloud-based portal enabling the manufacturer 20 to access to this information.

The skilled person will understand that current AI-enabled camera systems 154, 158 cannot decipher any 2D or data matrix 90 information, and without a shape or colour spectral marker taggant 102 being applied to the outer surface of the recyclable product 100 then the AI-enabled video camera 158 could not, on its own discriminate, for example, clear or tinted PET "contract bottles" which are used to contain many branded and supermarket-own drinks and bottled waters from its crushed shape alone. Marking a recyclable product 100 however with a UV/NIR/IR ink shape or colour taggant 50, 70, 80, 82, 84, 102 such that on being recycled it is possible, via detection of the ink, to separate the product 100 by way of reference to its manufacturer 20 or brand, and if trace maker or taggant 102 is applied as a printed code, such as a 2D data matrix 90, more information could be stored. As described herein, the ink taggant 102 can combine the properties of both UV/IR/NIR, such that separate information can be read from the same printed code 88 or data matrix 90, and the different cameras 152, 154 ensure this information is read correctly, with the AI-enabled camera system 158 acting as a fail-safe to validate the information obtained from cameras 152, 154.

The optical detection unit 140 of the present invention therefore allows for the reliable retrieval of data that can be reported back to brand owners in real time or near real time.

The manufacturer 20 or filler is then able to retrieve their bottles 100 back from the waste stream by their allocated UV shape and colour taggant 102 and that this can be achieved by current detection systems with retrofitted lighting or by robotic pickers operating under UV light conditions.

The manufacturer 20 or brand "separated" bales of single or co-mingled materials will then be shipped to relevant reprocessing facilities for manufacture into new materials and enabling brand owners to enter the circular economy.

The detection unit 140 unit will, in a preferred embodiment, contain the two detections zones 146, 148 in one self-contained unitary enclosure. This is in no way intended to be limiting as one or more additional detection zones 146, 148 can be added in a modular fashion, or the first and second detection zones 146, 148 can be provided in entirely different enclosures and linked together using known interface and communication protocols. For example, one unit 140 solely reads the data matrix 90 in UV orange/red and another entirely separate unit 140 reads or collects colours and shapes of spectral marker taggants 102 along the same conveyer 144.

As outlined above in relation to FIG. 13, whilst the optical detection unit 140 of FIG. 10 can detect and identify the manufacturer of the recyclable product based on the detected shape or colour of a spectral marker taggant 102 applied to the outer surface of the recyclable product 100 using artificial intelligence capabilities, and it is also possible to detect the shape and colour of alpha, numerical or alphanumerical codes 88 themselves applied to the outer surface of products 100 utilising artificial intelligence.

FIG. 15 is illustrative of a series of alpha, numerical and/or alphanumeric taggants 102 that have been applied to the outer surface of the recyclable product 100 which have been detected and classified by the detection unit 140 shown in FIG. 10. FIG. 15 shows a series of example data images captured by the UV optical detector 154 of the machine vision camera detection system 150 of FIG. 10, and which has been trained to detect and identify the manufacturer or brand of the recyclable product 100 based on detected alpha, numerical and/or alphanumeric taggants 102 applied to the outer surface of the recyclable product 100.

FIGS. 15a to 15d are various data images obtained of previously unseen marked products 100 with the identified code and degree of certainty shown in the bottom left hand section of each image. In the images shown in FIGS. 15a to 15d, the UV optical detector 154 has read and classified the UV red ink alpha, numerical or alphanumerical codes 88 correctly.

Figure 16:
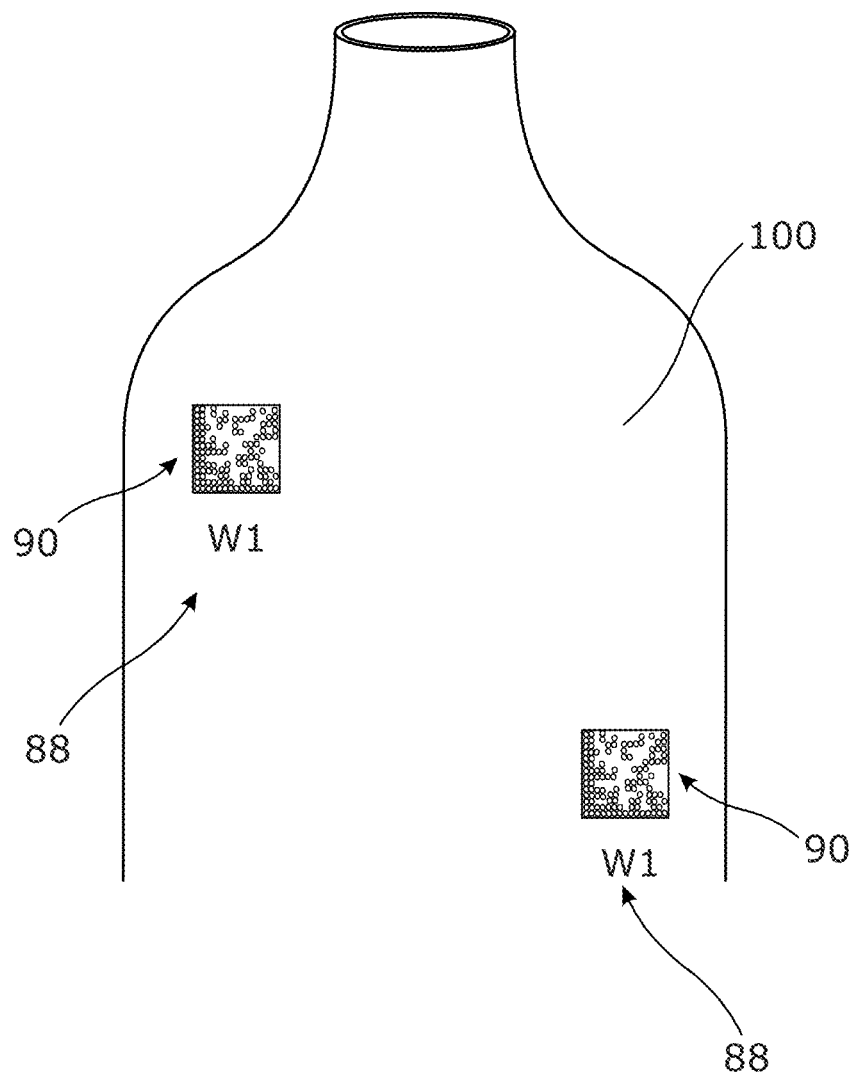
FIG. 16 illustrates a further schematic view of how the marker or taggant of the present invention can be applied on a recyclable product as a 2D data matrix and alphanumerical machine readable code.

FIG. 16 shows how marking the product 100 with a taggant 102 configured as a combinational UV data matrix 90 and UV alphanumerical code 88 allows the detection of the manufacturer or brand of the product 100 to be determined accurately and repeatedly, and also allows for the retrieval of data for recycling. Such an alphanumerical coding system may be configured along the lines of a first manufacturing partner 100 being assigned the letter U, and its brands are marked as follows with the following alphanumerical codes 88:

Brand A—U1
Brand B—U2
Brand C—U3 etc.

A second manufacturing partner is assigned the letter W, and its brands are marked as follows with the following alphanumerical codes 88:

Brand A—W1
Brand B—W2
Brand C—W3 etc.

The invention is not intended to be limited to the details of the embodiments described herein, which are described by way of example only. It is contemplated by the inventor that various substitutions, alterations and modifications may be made to the invention without departing from the spirit and scope of the invention as defined by the claims. It will be understood that features described in relation to any particular embodiment can be featured in combination with other embodiments. Example of these include the following:

As an example, although particular embodiments refer to utilising the closed loop recycling method 10 with polymer products, this is in no way intended to be limiting as any number of different types of recyclable products, packaging, materials and items can be tagged and recycled.

It is also envisaged that the present invention, and particularly the means of providing traceable packaging materials and products 100 that are recoverable through the supply chain could instead of being separated for recycling be recognised or detected and summed in a data set. This data set can be extremely useful to manufacturers in addition to the separation of the product 100 for subsequent recycling, as the data set can reveal patterns, trends and associations, especially relating to use, recycling behaviours, shelf life and lifecycle of the product 100 from its manufacture to its consumption and disposal.

All data that is written to, and read from, the 1D, 2D or 3D data matrix 90, barcode or QR code and/or suitable alpha, numerical or alphanumeric coding process 88 or from the marker shape or colour taggant 50, 70, 80, 82, 84, 102 is encrypted and authenticated to prevent impersonation and fraud. The skilled person will understand that various technologies can be used to enable secure tracking of the product's 100 lifecycle, including blockchain technology.

The data gathered at any point in the lifecycle of the product 100 can be transferred to a corporate network or cloud-based system to provide the manufacturer 20 with an large data set which can be processed using a variety of processing techniques to extract and transform information for further commercial use and planning during the manufacture, transportation, distribution, utilisation and recycling of the product 100. All communications between the manufacturer 20, the MRF/PRF 26 or the secondary processing facility 30 or to strategic partners in the supply chain and via the cloud-based portal are encrypted and authenticated.

It is also envisaged that the product 100 information can also be accessed via a remote application software or user interface embodied which can be on a remote computing device and/or a mobile communications device, and which is securely connected to the portal. All available means of protecting the data from fraud and hacking shall be in place, as is known to someone skilled in the art.

The detection methodologies and systems described herein are not limited to separation at the MRF/PRF 26 or at a secondary processing facility 30 for onward recycling. The present invention can also be embodied in recycling stations or reverse vending systems and schemes. The data that can be represented in the printed code 88, for example, can read and shared to prove compliance with national and international reverse vending legislation including deposit-return systems, local authority collection receptacles, recycling points and schemes.

Furthermore, although embodiments of the present invention are described by of illuminating and subsequently detecting trace marker or taggants 102 and/or printed codes 88 on the product 100 with light that is invisible to humans, the skilled person will appreciate the detection methodologies and systems described herein could be achieved by a visible marking on the bottles/packaging 100. Whilst the branding themes and aesthetics that the manufacturer 20 employs in the course of trade to market its products 100 will of course be altered or diluted because of the inclusion of various visible coloured inks and shapes for subsequent brand/manufacturer recycling and/or printed data matrix codes, such visible marking does not depart from the scope of the present invention.

In this regard, it is appreciated that the machine vision (optical) camera detection system 150 positioned in the first detection zone 146 could be modified so that it operates in the visible light spectrum instead of operating under UV conditions. In this regard, a visible ink data matrix 90 and visible ink shape or colour 50, 70, 80, 82, 84, 102 could be applied at the manufacturer 20 during, or in unison, with the filling stage (S126). The visible ink data matrix 90 and/or shape or colour taggant 50, 70, 80, 82, 84, 102 being applied on the outer surface of the product 100 or underneath sleeves or labelling which can be separated intentionally from the product 100 during recycling or detached during baling and/or transport. In the current climate, a manufacturer 20 may alternatively wish to promote its green credentials by having visible recycling marks on the products 100.

Whilst a number of different colours for the printed code 88 or data matrix 90 and/or marker shape or taggant 50, 70, 80, 82, 84, 102 are envisaged (FIGS. 2 and 4 to 6 include illustrative examples), marking the product 100 using only one ink colour, by way of example, a red or orange UV data matrix 90 and/or in combination with red or orange UV alpha, numerical or alphanumerical codes 88 allows the detection of the manufacturer or brand of the product 100 to be determined accurately and repeatedly whilst allowing for the retrieval of additional data for recycling.

It is also envisaged that the marking, shapes or patterns formed by the primary and secondary dots 50, 70, 80, 82, 84, 102, registration marks 86 and/or printed codes 88 could be applied into the contouring of the bottles/packaging 100, if required. The term "contouring" can mean any mechanical feature or facet disposed on the product 100 which is included to enhance the use or style of the product, such as, for example, finger indents or detents or the like. In addition, the packaging/bottles 100 could be marked before the application of its brand labelling, such that if the product labels fall off during the recycling process the primary and secondary dots 50, 70, 80, 82, 84, 102, registration marks 86 and/or printed codes 88 are exposed underneath for data reading and recovery for recycling.

Furthermore, it is envisaged that the printed code 88 could be configured or embedded in the form of printed electronics packaging, or applied as a smart label employing electromagnetic induction to write and read the code 88 on the recyclable product 100.

CLAUSES

The following clauses define preferred embodiments of the invention.

1. A method of marking a product, the method comprising the steps of: applying at least a portion of the product or its packaging with a machine readable code, the machine readable code fluoresces under excitation conditions to allow detection and recovery of the encoded data, the fluorescing shape or colour of the machine readable code allows the detection of the manufacturer or brand of the product.

2. The method according to clause 1, wherein the product is separated from a mixed feedstock for onward recycling based on the detected fluorescing shape or colour of the machine readable code.

3. The method according to clause 1, wherein the machine readable code is a 1D, 2D or 3D barcode, data matrix or QR code or any other suitable coding structure.

4. The method according to clause 3, wherein the machine readable code being excited using radiation having an excitation wavelength in the UV, IR, NIR or visible light spectrum.

5. The method according to clause 4, wherein the detection of the encoded data and the fluorescing shape or colour are detected at the same or different excitation wavelengths within the same or different optical detectors 6. The method according to clause 1, wherein the recovered data includes production data and/or PRN and/or PERN and/or EPR compliance information.

7. A method of uniquely identifying a product for subsequent recycling, comprising the step of: marking a surface of the product with a first trace signature being representative of the manufacturer of the product.

8. The method according to clause 7, wherein the first trace signature being any chemical or physical marker capable of being read at a detector.

9. The method according to clauses 7 or 8, wherein the first trace signature is at least one ultraviolet (UV), NIR and/or infrared (IR) readable dot being applied to the product using continuous inkjet printing or any other suitable marking or coding system.

10. The method according to clause claim 9, wherein the at least one readable dot is a fluorescent mark that is transparent, and is only detectable when it is illuminated with UV, NIR and/or IR light at the detector.

11. The method according to clause 10, wherein the at least one readable dot is printed in pairs on generally opposing surfaces of the product.

12. The method according to clause 10, wherein the at least one readable dot is printed in a randomised manner around the surfaces of the product.

13. The method according to clause 10, wherein the fluorescent mark is applied as a luminescent or fluorescent ink.

14. The method according to clause 13, wherein the fluorescent mark is applied having a base layer being in contact with the product; a fluorescent layer on top of the base layer; and an uppermost protective layer on top of the fluorescent layer.

15. The method according to clause 13, wherein the base layer, the fluorescent layer and the uppermost protective layer are applied via a continuous inline inkjet printing process or any other suitable marking or coding system.

16. The method according to clauses 14 or 15, wherein the base layer is opaque and eliminates false detections when used with substantially transparent products.

17. The method according to any of clauses 13 to 16, wherein the fluorescent mark is completely removed during the subsequent recycling process.

18. The method according to any of clauses 13 to 17, wherein the fluorescent mark does not obscure the branding and/or product information on the product.

19. The method according to clause 8, wherein the first trace signature is a dot being printed in one of a number of shapes and colours that are detectable by the detector.

20. The method according to clause 19, wherein the dot is printed having a triangular, square, rectangular, pentagonal, hexagonal, octagonal, cylindrical or any suitable polygonal shape or vertical or horizontal line or band.

21. The method according to clause 8, wherein the first trace signature is detectable by its outer shape and/or visible colour and/or an alphanumeric identifier.

22. The method according to any of the preceding clauses, wherein the first trace signature is applied to the product and/or a lid or closure to the product and/or a removable tear strip positioned between the product and the lid or closure.

23. The method according to any of the preceding clauses, wherein the first trace signature is applied to a printed label which is subsequently adhered to the product.

24. The method according to clause 23, wherein the label also comprises the manufacturer's name and/or a RAL or Pantone code being representative of the manufacturer of the product.

25. The method according to clause 1, wherein the first trace signature is applied as a masterbatch or polymer carrier by pellet, liquid or powder form and supplied by gravimetric or other compatible dosing process.

26. The method according to clause 25, wherein the first trace signature is applied to the outer surface of the product.

27. The method according to any of the preceding clauses, wherein the product is packaging.

28. The method according to clause 27, wherein the packaging is formed from a material selected from the group consisting, but not limited to, any one of the following: polymers, cardboard, paper, cellophane, ferrous and non-ferrous metals, composite alloys and the like.

29. The method according to any of the preceding clauses, further comprising the step of: marking a surface of the product with a second trace signature being representative of the brand or composition of the product.

30. The method according to clause 29, wherein the first and second trace signatures are detected separately.

31. The method according to clause 7, further comprising the step of: marking a surface of the product with a plurality of trace signatures being representative of the source of manufacture and/or base polymer manufacturer and/or polymer material and/or material grade and/or brand of product, and which enables the subsequent separation of the product based on the detected attributes of the product.

32. The method according to clause 31, wherein the plurality of trace signatures are printed as a string of readable dots or as a 1D, 2D or 3D data matrix, barcode or QR code, or any other suitable industrial alpha, numerical or alphanumeric coding process.

33. The method according to clause 32, wherein the string of readable dots are printed with a registration mark.

34. The method according to clause 8, wherein the detector detects the presence of illuminated UV and/or IR light and/or near-infrared and/or visible light and/or shape or pattern recognition.

35. A recyclable product, the product comprising a mark on the outer surface thereof being a first trace signature representative of the manufacturer of the product.

36. A method of detecting a uniquely marked product for subsequent recycling, comprising the step of:
  reading a surface of the product with a detector; and
  detecting a first trace signature being representative of the manufacturer of the product.

37. A method of closed loop recycling of a target product being marked with a first trace signature being representative of the manufacturer of the product, comprising the steps of:
  detecting the first trace signature and separating the detected target product from a mixed feedstock based on said detection;
  optionally separating the target product further into sub-groups based on the brand or composition thereof;
  shredding the separated product into flakes;
  washing the flakes;
  compounding the washed flakes; and
  forming a new product from the compounded pellets.

38. A label for securement to a recyclable product, the label being printed thereon with a first trace signature being representative of the manufacturer of the product.

39. A method of uniquely identifying a target recyclable product in a continuous feedstock of mixed recyclable products, comprising the steps of:
  capturing a digital image of the recyclable product;
  creating a trained database of digital images of recyclable products;
  recognising a recyclable product present in a digital image; and
  matching the information from a product database with the recognised image of a target recyclable product.

40. The method according to clause 39, further comprising the step of: separating the target recyclable product from the feedstock for subsequent recycling.

41. The method according to clause 40, wherein the step of separating the target recyclable product from the feedstock for subsequent recycling is achieved at a conveyor detecting speed of under around one metre per second and up to three metres per second and above.

42. The method according to clauses 40 or 41, wherein the target recyclable product is separated from the feedstock based on the manufacturer or brand of the product.

43. The method according to any of clauses 39 to 42, wherein the training and recognising steps are achieved using a neural network.

44. A computer program product for uniquely identifying a target recyclable product in a continuous feedstock of mixed recyclable products, comprising:
  computer program means for capturing a digital image of the recyclable product;
  computer program means for creating a trained database of digital images of recyclable products;
  computer program means for recognising a recyclable product present in a digital image; and
  computer program means for matching the information from a product database with the recognised image of a target recyclable product.

45. A system for uniquely identifying a target recyclable product in a continuous feedstock of mixed recyclable products, comprising:
  means for capturing a digital image of the recyclable product;
  means for creating a trained database of digital images of recyclable products;
  means for recognising a recyclable product present in a digital image; and
  means for matching the information from a product database with the recognised image of a target recyclable product.

46. The system according to clause 45, further comprising:
  means for separating the target recyclable product from the feedstock for subsequent recycling.

The invention claimed is:

1. A method for recycling, the method comprising the steps of:
  (a) producing a product by a manufacturer;
  (b) creating a trained database of digital images of marked products by said manufacturer;
  (c) printing a unique machine readable taggant code having a code shape and a code color to at least a portion of said product of said manufacturer,
  wherein said code shape is associated with a manufacturer identity of said manufacturer in said trained database,
  wherein said code color is associated with said manufacturer identity of said manufacturer in said trained database, and
  wherein said unique machine readable taggant code is associated with product lifecycle data in said trained database;
  (d) reading and validating the code applied to the product by said manufacturer as a first point of said product lifecycle data, said product lifecycle data in said trained database being comprised of said first point;
  (e) dispatching the product for a first use;
  (f) recovering the product with the code after said first use at a first recovery facility;
  (g) capturing a first image of the product with the code at said first recovery facility so as to determine a first captured image;
  (h) matching said first captured image with at least one digital image of said trained database as a second point of said product lifecycle data so as to add said second point to said product lifecycle data in said trained database and identify said manufacturer;
  (i) retrieving the product with the code by said manufacturer;
  (j) restoring said product for a second use as a restored product by said manufacturer;
  (k) reading and validating the code applied to said restored product by said manufacturer as a third point of said product lifecycle data, said product lifecycle data in said trained database being comprised of said first point, said second point, and said third point;
  (l) dispatching said restored product for said second use so as to form a remnant of said unique machine readable taggant code, after said second use, said remnant being comprised of a damaged portion of said unique machine readable taggant code so as to render said unique machine readable taggant code unreadable, said remnant having at least one of said code shape and said code color of said unique machine readable taggant code;

(m) recovering said restored product with said remnant of the code at a second recovery facility;

(n) capturing a second image of said restored product with said remnant of the code at said second recovery facility so as to determine a second captured image based on said remnant;

(o) matching said second captured image with said manufacturer identity of said manufacturer corresponding to said code shape or said code color of said remnant;

(p) retrieving said restored product with said remnant by said manufacturer identified by said second matched image; and (q) restoring said restored product for a third use with a repaired unique machine readable taggant code as a repaired product by said manufacturer, wherein said repaired unique machine readable taggant code is associated with repaired product lifecycle data in said trained database;

(r) reading and validating the repaired code applied to the repaired product by said manufacturer as a first repaired point of said repaired product lifecycle data, said repaired product lifecycle data in said trained database being comprised of said first repaired point;

(s) dispatching the repaired product for a first repaired use;

(t) recovering the repaired product with the repaired code after said first repaired use at another recovery facility;

(u) capturing a first repaired image of the product with the repaired code at said another recovery facility so as to determine a first repaired captured image;

(v) matching said first repaired captured image with at least one digital image of said-trained database as a second repaired point of said repaired product lifecycle data so as to add said second repaired point to said repaired product lifecycle data in said trained database and identify said manufacturer;

(w) retrieving the repaired product with the repaired code by said manufacturer;

(x) restoring the repaired product for a second repaired use as the repaired product by said manufacturer; and (y) repeating the steps (r)-(w) until said product lifecycle data is comprised of a final point of said repaired product lifecycle data.

2. The method for recycling, according to claim 1, further comprising the step of:
securely storing said trained database in a remote database or cloud-based portal.

3. The method for recycling, according to claim 1, wherein at least one of said code shape and said code color of said unique machine readable taggant code is fluorescent, and
wherein the step (i) of retrieving the product with the code comprises the step of:
separating the product with the code from a mixed feedstock of said first recovery facility by detecting a fluorescing code shape or code color.

4. The method for recycling, according to claim 1, wherein said unique machine readable taggant code is comprised of at least one of a group consisting of: a one dimensional barcode, a two dimensional barcode, a three dimensional bar code, a one dimensional data matrix, a two dimensional data matrix, a three dimensional data matrix, a one dimensional quick response (QR) code, a two dimensional QR code and a three dimensional QR code.

5. The method for recycling, according to claim 1, wherein said product lifecycle data is further comprised of at least one of a group consisting of: timestamp, tracking information, metadata, production data of said product, packaging recovery note (PRN) of said product, packaging export recovery note (PERN) of said product, and extended producer responsibility (EPR) compliance information of said product.

6. The method for recycling, according to claim 1, wherein said step (n) of capturing said second image is at an excitation wavelength different than an excitation wavelength of the step (g) of capturing said first image.

7. The method for recycling, according to claim 1, wherein said remnant is comprised of a partial 2D data matrix being fluorescent red or orange under UV excitation.

8. The method for recycling, according to claim 1, wherein said unique machine readable taggant code is comprised of a 2D data matrix being fluorescent red or orange under UV excitation.

* * * * *